US012812143B2

(12) United States Patent
Paluri et al.

(10) Patent No.: US 12,812,143 B2
(45) Date of Patent: *Nov. 24, 2026

(54) VIDEO OR IMAGE CODING BASED ON SIGNALING OF SCALING LIST DATA

(71) Applicant: LG Electronics Inc., Seoul (KR)

(72) Inventors: Seethal Paluri, Seoul (KR); Seunghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 78 days.

This patent is subject to a terminal disclaimer.

(21) Appl. No.: 18/810,056

(22) Filed: Aug. 20, 2024

(65) Prior Publication Data

US 2024/0414362 A1 Dec. 12, 2024

Related U.S. Application Data

(63) Continuation of application No. 17/598,123, filed as application No. PCT/KR2020/004693 on Apr. 7, 2020, now Pat. No. 12,096,011.

(60) Provisional application No. 62/834,375, filed on Apr. 15, 2019.

(51) Int. Cl.

| | |
|---|---|
| ***H04N 19/30*** | (2014.01) |
| ***H04N 19/124*** | (2014.01) |
| ***H04N 19/174*** | (2014.01) |
| ***H04N 19/176*** | (2014.01) |
| ***H04N 19/18*** | (2014.01) |

(52) U.S. Cl.

CPC ........... *H04N 19/30* (2014.11); *H04N 19/124* (2014.11); *H04N 19/174* (2014.11); *H04N 19/176* (2014.11); *H04N 19/18* (2014.11)

(58) Field of Classification Search

None

See application file for complete search history.

(56) References Cited

U.S. PATENT DOCUMENTS

| | | | | |
|---|---|---|---|---|
| 10,595,048 | B1 * | 3/2020 | Wenger ................ | H04N 19/127 |
| 12,096,011 | B2 * | 9/2024 | Paluri .................. | H04N 19/126 |
| 2013/0182755 | A1 * | 7/2013 | Chen ...................... | H04N 19/70 375/240.01 |
| 2014/0369404 | A1 * | 12/2014 | Van Der Auwera ......................... | H04N 19/159 375/240.02 |
| 2015/0334396 | A1 * | 11/2015 | Lim ..................... | H04N 19/126 375/240.03 |
| 2019/0238845 | A1 * | 8/2019 | Zhang .................. | H04N 19/182 |
| 2020/0077090 | A1 * | 3/2020 | Wennersten ........... | H04N 19/80 |
| 2020/0288134 | A1 * | 9/2020 | Lim ..................... | H04N 19/129 |
| 2021/0076073 | A1 * | 3/2021 | Deshpande ............ | H04N 19/70 |

(Continued)

FOREIGN PATENT DOCUMENTS

| | | |
|---|---|---|
| GB | 2501125 A | 10/2013 |

OTHER PUBLICATIONS

Sullivan et al. "Meeting Report of the 14th Meeting of the Joint Video Experts Team (JVET)", Mar. 2019, pp. 1-159. (Year: 2019).*

(Continued)

*Primary Examiner* — Kaveh Abrishamkar

(74) *Attorney, Agent, or Firm* — Fish & Richardson P.C.

(57) ABSTRACT

According to a disclosure of the present document, scaling list data and scaling list-related information may be hierarchically signaled, and through same, the amount of data which must be signaled for video/image coding may be reduced, and coding efficiency may be increased.

4 Claims, 9 Drawing Sheets

(56) References Cited

U.S. PATENT DOCUMENTS

| | | | | |
|---|---|---|---|---|
| 2021/0258598 | A1* | 8/2021 | Hendry | H04N 19/463 |
| 2021/0368207 | A1* | 11/2021 | Li | H04N 19/70 |
| 2021/0392323 | A1* | 12/2021 | Wang | H04N 19/186 |
| 2022/0086443 | A1* | 3/2022 | Lim | H04N 19/124 |
| 2022/0132107 | A1* | 4/2022 | Paluri | H04N 19/174 |

OTHER PUBLICATIONS

Office Action in Chinese Appln. No. 202080028623.3, mailed on Sep. 20, 2024, 14 pages (with English translation).

* cited by examiner

VIDEO OR IMAGE CODING BASED ON SIGNALING OF SCALING LIST DATA

CROSS-REFERENCE TO RELATED APPLICATIONS

This application is a continuation of U.S. application Ser. No. 17/598,123, filed on Sep. 24, 2021, which is a National Stage application under 35 U.S.C. § 371 of International Application No. PCT/KR2020/004693, filed on Apr. 7, 2020, which claims the benefit of U.S. Provisional Application No. 62/834,375, filed on Apr. 15, 2019. The disclosures of the prior applications are incorporated by reference in their entirety.

TECHNICAL FIELD

The present disclosure relates an image or a video coding, for example, related to coding techniques based on signaling scaling list data.

BACKGROUND

The demands for high-resolution and high-quality images and video, such as an ultra high definition (UHD) image and video of 4K or 8K or more, are recently increasing in various fields. As image and video data become high resolution and high quality, the amount of information or the number of bits that is relatively transmitted is increased compared to the existing image and video data. Accordingly, if image data is transmitted using a medium, such as the existing wired or wireless wideband line, or image and video data are stored using the existing storage medium, transmission costs and storage costs are increased.

Furthermore, interests and demands for immersive media, such as virtual reality (VR), artificial reality (AR) content or a hologram, are recently increasing. The broadcasting of an image and video having image characteristics different from those of real images, such as game images, is increasing.

Accordingly, there is a need for a high-efficiency image and video compression technology in order to effectively compress and transmit or store and playback information of high-resolution and high-quality images and video having such various characteristics.

In addition, there is a discussion on an adaptive frequency weighting quantization technique in the scaling process in order to improve compression efficiency and increase subjective/objective visual quality. In order to efficiently apply this technique, a method for signaling related information is needed.

SUMMARY

A technical aspect of the present disclosure is to provide a method and an apparatus for increasing image coding efficiency.

Another technical aspect of the present disclosure is to provide a method and apparatus for increasing coding efficiency in a scaling process.

Still another technical aspect of the present disclosure is to provide a method and apparatus for efficiently constructing a scaling list used in a scaling process.

Yet another technical aspect of the present disclosure is to provide a method and apparatus for hierarchically signaling scaling list related information used in a scaling process.

Yet another technical aspect of the present disclosure is to provide a method and apparatus for efficiently applying a scaling list-based scaling process.

According to an embodiment of this document, scaling list data may be signaled through an adaptation parameter set (APS), and APS identification information (APS ID) indicating the ID of the APS referenced for the scaling list data may be signaled through header information (picture header/slice header/tile group header, etc.).

According to an embodiment of this document, type information of APS parameters may be signaled through the APS, and whether the corresponding APS is scaling list data (scaling list parameters) APS may be indicated based on the type information of the APS parameters.

According to an embodiment of this document, an available flag information indicating whether the scaling list data is available may be signaled hierarchically, and based on the available flag information signaled in the higher-level syntax (e.g., SPS), available flag information in the lower-level syntax (for example, a picture header/slice header/type group header, etc.) may be signaled.

According to an embodiment of this document, constraint flag information may be signaled through a general constraint information syntax, and whether the available flag information of the scaling list data is used may be indicated based on the constraint flag information.

According to an embodiment of this document, APS ID number information indicating the number of IDs of APS related to the scaling list data may be signaled through header information, and identification information syntax elements of APS related to the scaling list data as many as the number of APS IDs may be signaled.

According to an embodiment of the present document, a video/image decoding method performed by a decoding apparatus is provided. The video/image decoding method may include the method disclosed in the embodiments of this document.

According to an embodiment of the present document, a decoding apparatus for performing video/image decoding is provided. The decoding apparatus may perform the method disclosed in the embodiments of this document.

According to an embodiment of the present document, a video/image encoding method performed by an encoding apparatus is provided. The video/image encoding method may include the method disclosed in the embodiments of this document.

According to an embodiment of the present document, an encoding apparatus for performing video/image encoding is provided. The encoding apparatus may perform the method disclosed in the embodiments of this document.

According to an embodiment of the present document, a computer-readable digital storage medium storing encoded video/image information generated according to the video/image encoding method disclosed in at least one of the embodiments of this document is provided.

According to an embodiment of the present document, a computer-readable digital storage medium storing encoded information or encoded video/image information causing a decoding apparatus to perform the video/image decoding method disclosed in at least one of the embodiments of this document is provided.

This document may have various effects. For example, according to an embodiment of the present document, overall image/video compression efficiency may be increased. In addition, according to an embodiment of the present document, by applying an efficient scaling process, it is possible to increase coding efficiency and improve subjective/objective visual quality. In addition, according to an embodiment of the present document, it is possible to efficiently configure a scaling list used in a scaling process, and through this, it is possible to hierarchically signal scaling list related information. In addition, according to an embodiment of this document, coding efficiency may be increased by efficiently applying a scaling list-based scaling process.

Effects that can be obtained through specific embodiments of the present document are not limited to the effects listed above. For example, various technical effects that a person having ordinary skill in the related art can understand or derive from this document may exist. Accordingly, the specific effects of this document are not limited to those explicitly described in this document, and may include various effects that can be understood or derived from the technical characteristics of the present document.

DESCRIPTION OF EXEMPLARY EMBODIMENTS

Figure 1:
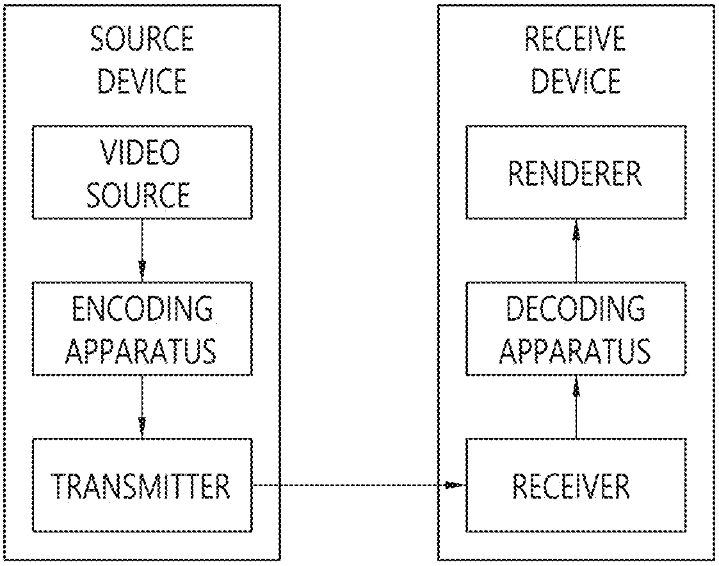
FIG. 1 schematically represents an example of a video/image coding system to which embodiments of the present disclosure may be applied.

This document may be modified in various ways and may have various embodiments, and specific embodiments will be illustrated in the drawings and described in detail. However, this does not intend to limit this document to the specific embodiments. Terms commonly used in this specification are used to describe a specific embodiment and is not used to limit the technical spirit of this document. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in this document are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of this document unless it deviates from the essence of this document.

In this document, the term "A or B" may mean "only A", "only B", or "both A and B". In other words, in this document, the term "A or B" may be interpreted to indicate "A and/or B". For example, in this document, the term "A, B or C" may mean "only A", "only B", "only C", or "any combination of A, B and C".

A slash "/" or a comma used in this document may mean "and/or". For example, "A/B" may mean "A and/or B". Accordingly, "A/B" may mean "only A", "only B", or "both A and B". For example, "A, B, C" may mean "A, B or C".

In this document, "at least one of A and B" may mean "only A", "only B", or "both A and B". Further, in this document, the expression "at least one of A or B" or "at least one of A and/or B" may be interpreted the same as "at least one of A and B".

Further, in this document, "at least one of A, B and C" may mean "only A", "only B", "only C", or "any combination of A, B and C". Further, "at least one of A, B or C" or "at least one of A, B and/or C" may mean "at least one of A, B and C".

Further, the parentheses used in this document may mean "for example". Specifically, in the case that "prediction (intra prediction)" is expressed, it may be indicated that "intra prediction" is proposed as an example of "prediction". In other words, the term "prediction" in this document is not limited to "intra prediction", and it may be indicated that "intra prediction" is proposed as an example of "prediction". Further, even in the case that "prediction (i.e., intra prediction)" is expressed, it may be indicated that "intra prediction" is proposed as an example of "prediction".

This document relates to video/image coding. For example, the methods/embodiments disclosed in this document may be applied to a method disclosed in the versatile video coding (VVC). Further, the methods/embodiments disclosed in this document may be applied to a method disclosed in the essential video coding (EVC) standard, the AOMedia Video 1 (AV1) standard, the 2nd generation of audio video coding standard (AVS2), or the next generation video/image coding standard (ex. H.267 or H.268, etc.).

This document presents various embodiments of video/image coding, and the embodiments may be performed in combination with each other unless otherwise mentioned.

In this document, a video may mean a set of a series of images according to the passage of time. A picture generally means a unit representing one image in a specific time period, and a slice/tile is a unit constituting a part of the picture in coding. The slice/tile may include one or more coding tree units (CTUs). A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of complete tiles or an integer number of consecutive complete CTU rows within a tile of a picture that may be exclusively contained in a single NAL unit.

Meanwhile, one picture may be divided into two or more subpictures. The subpicture may be a rectangular region of one or more slices within the picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

Also, in this document, at least one of quantization/dequantization and/or transform/inverse transform may be omitted. When the quantization/dequantization is omitted, the quantized transform coefficient may be referred to as a transform coefficient. When the transform/inverse transform is omitted, transform coefficients may be called coefficients or residual coefficients, or may still be called transform coefficients for the sake of uniformity of expression.

In this document, a quantized transform coefficient and a transform coefficient may be referred to as a transform coefficient and a scaled transform coefficient, respectively. In this case, the residual information may include information about the transform coefficient(s), and the information about the transform coefficient(s) may be signaled through a residual coding syntax. Transform coefficients may be derived based on residual information (or information about transform coefficient(s)), and scaled transform coefficients may be derived through inverse transform (scaling) on the transform coefficients. Residual samples may be derived based on an inverse transform (transform) for the scaled transform coefficients. This may be applied/expressed in other parts of this document as well.

In this document, technical features individually explained in one drawing may be individually implemented, or may be simultaneously implemented.

Hereinafter, preferred embodiments of this document are described more specifically with reference to the accompanying drawings. Hereinafter, in the drawings, the same reference numeral is used in the same element, and a redundant description of the same element may be omitted.

FIG. 1 schematically illustrates an example of a video/image coding system to which embodiments of this document may be applied.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
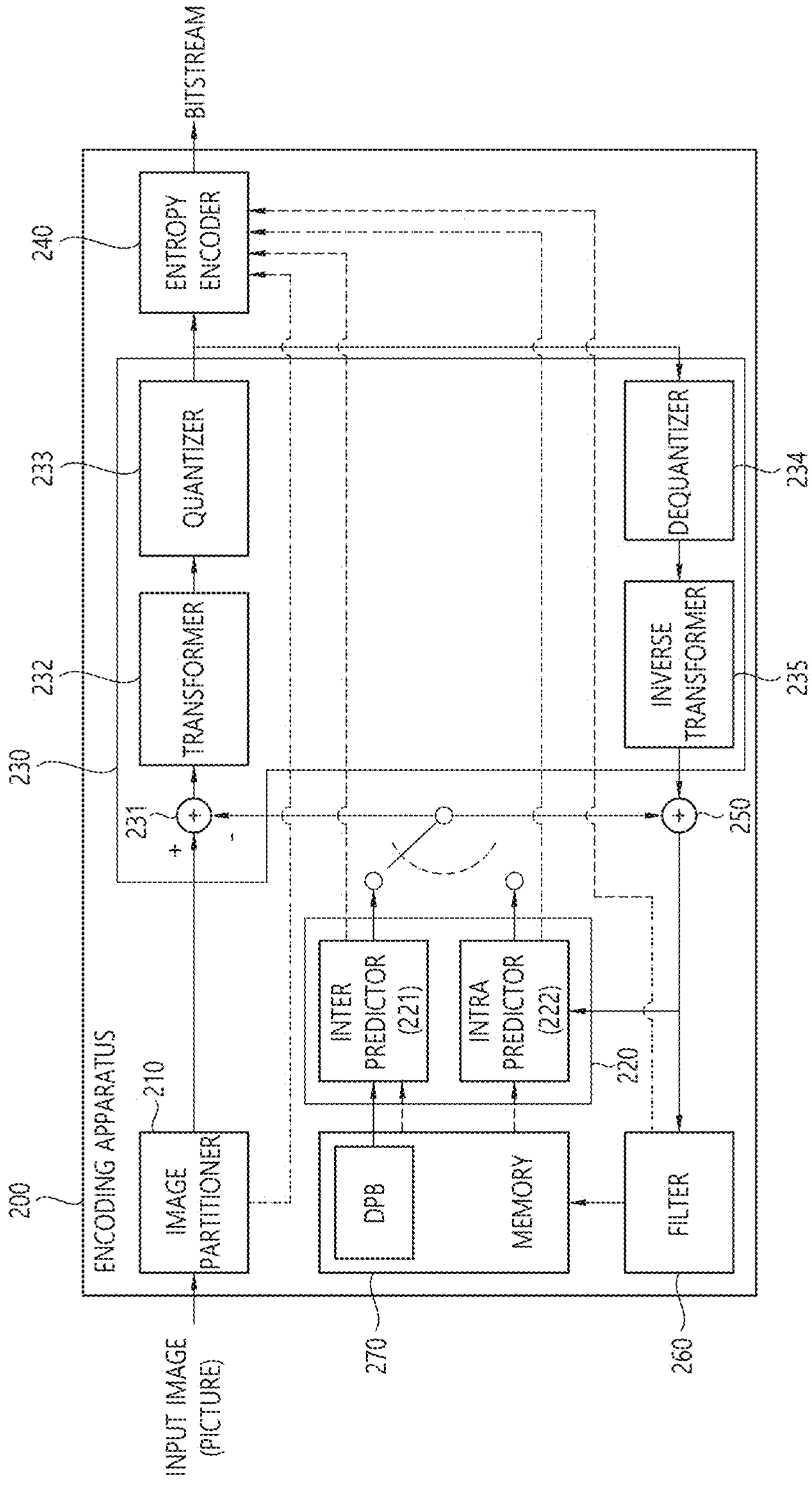
FIG. 2 is a diagram schematically describing a configuration of a video/image encoding apparatus to which embodiments of the present disclosure may be applied.

FIG. 2 is a schematic diagram illustrating a configuration of a video/image encoding apparatus to which the embodiment(s) of the present document may be applied. Hereinafter, the encoding apparatus may include an image encoding apparatus and/or a video encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, a deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
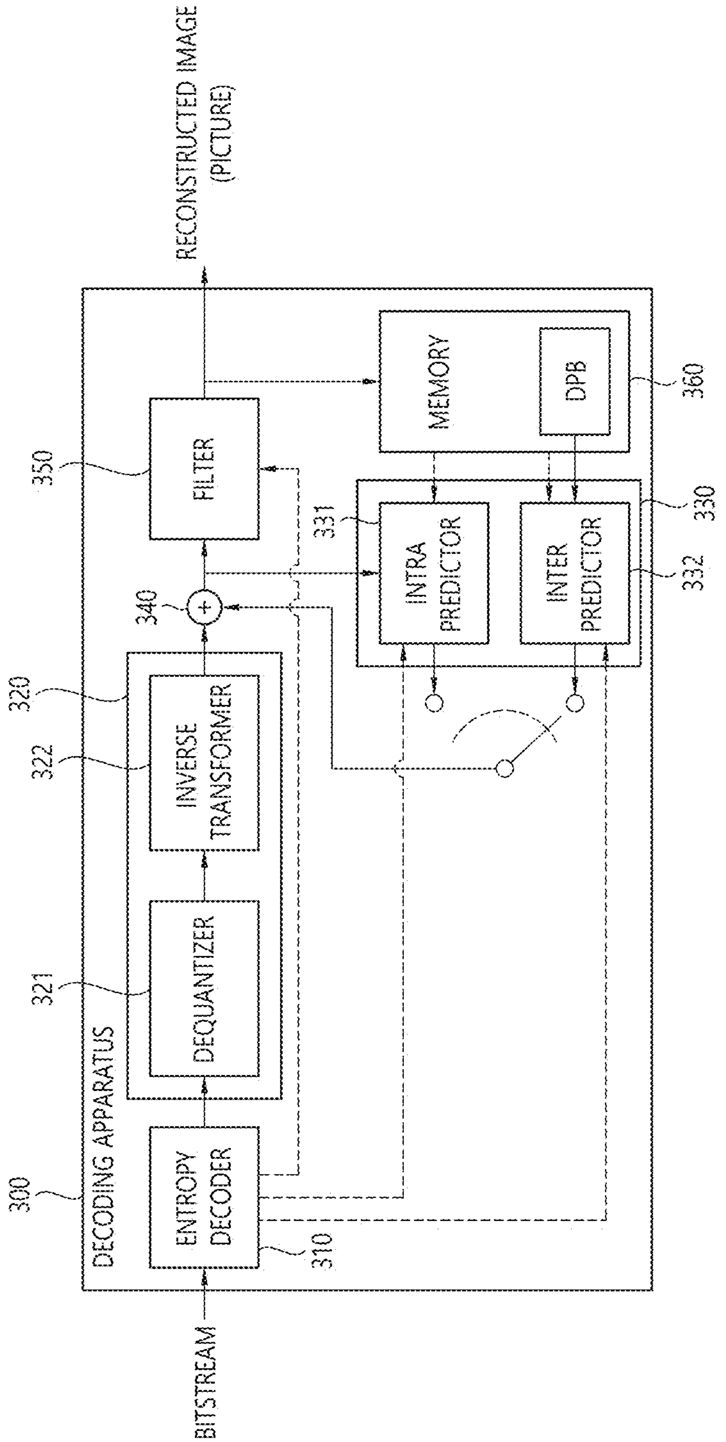
FIG. 3 is a diagram schematically describing a configuration of a video/image decoding apparatus to which embodiments of the present disclosure may be applied.

FIG. 3 is a schematic diagram illustrating a configuration of a video/image decoding apparatus to which the embodiment(s) of the present document may be applied. Hereinafter, the decoding apparatus may include an image decoding apparatus and/or a video decoding apparatus.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, a deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, a prediction is performed to enhance compression efficiency. A predicted block including prediction samples for a current block, that is, a target coding block, can be generated through the prediction. In this case, the predicted block includes the prediction samples in a spatial domain (or pixel domain). The predicted block is identically derived in the encoding apparatus and the decoding apparatus. The encoding apparatus can enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization process. For example, the encoding apparatus may derive the residual block between the original block and the predicted block, may derive transform coefficients by performing a transform procedure on the residual samples (residual sample array) included in the residual block, may derive quantized transform coefficients by performing a quantization process on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform process based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

The intra prediction may indicate prediction that generates prediction samples for the current block based on reference samples in a picture to which the current block belongs (hereinafter, referred to as a current picture). When the intra prediction is applied to the current block, neighboring reference samples to be used for the intra prediction of the current block may be derived. The neighboring reference samples of the current block may include a total of 2×nH samples which are samples adjacent to the left boundary and samples neighboring to the bottom-left of the current block of size nW×nH, a total of 2×nW samples which are samples adjacent to the top boundary of the current block and samples neighboring the top-right of the current block, and one sample neighboring the top-left of the current block. Alternatively, the neighboring reference samples of the current block may include top neighboring samples of a plurality of columns and left neighboring samples of a plurality of rows. In addition, the neighboring reference samples of the current block may include a total of nH samples adjacent to the right boundary of the current block of size nW×nH, a total of nW samples adjacent to the bottom boundary of the current block, and one sample neighboring the bottom-right of the current block.

However, some of the neighboring reference samples of the current block have not yet been decoded or may not be available. In this case, the decoding apparatus may construct the neighboring reference samples to be used for prediction by substituting unavailable samples with available samples. Alternatively, the neighboring reference samples to be used for prediction may be configured through interpolation of available samples.

When the neighboring reference samples are derived, (i) a prediction sample can be derived based on the average or interpolation of the neighboring reference samples of the current block, and (ii) the prediction sample may be derived based on a reference sample existing in a specific (prediction) direction with respect to the prediction sample among neighboring reference samples of the current block. The case of (i) may be called a non-directional mode or a non-angular mode, and the case of (ii) may be called a directional mode or an angular mode.

In addition, the prediction sample may be generated through interpolation of a first neighboring sample located in the prediction direction of the intra prediction mode of the current block, based on the prediction sample of the current block, and a second neighboring sample located in a direction opposite to the prediction direction, among the neighboring reference samples. The above-described case may be referred to as linear interpolation intra prediction (LIP). In addition, chroma prediction samples may be generated based on the luma samples using a linear model. This case may be called LM mode or CCLM (chroma component LM) mode.

Further, temporary prediction samples of the current block may be derived based on the filtered neighboring reference samples, and the prediction sample of the current block may also be derived by weighted-summing at least one reference sample, which is derived according to the intra prediction mode among conventional neighboring reference samples, that is, the neighboring reference samples not filtered, and the temporary prediction sample. The aforementioned case may be called a position dependent intra prediction (PDPC).

Further, the prediction sample may be derived using the reference sample positioned in a prediction direction in a corresponding line by selecting a reference sample line with the highest prediction accuracy among the neighboring multi-reference sample lines of the current block, and an intra prediction encoding may be performed by a method for indicating (signaling) the reference sample line used at this time to the decoding apparatus. The aforementioned case may be called multi-reference line (MRL) intra prediction or intra prediction based on the MRL.

Further, the intra prediction may be performed based on the same intra prediction mode by splitting the current block into vertical or horizontal sub-partitions, and the neighboring reference samples may be derived and used in units of sub-partition. That is, in this case, the intra prediction mode for the current block is equally applied to the sub-partitions, and the neighboring reference sample may be derived and used in units of sub-partition, thereby enhancing intra prediction performance in some cases. Such a prediction method may be called intra sub-partitions (ISP) intra prediction or intra prediction based on the ISP.

The aforementioned intra prediction methods may be called an intra prediction type separately from the intra prediction mode. The intra prediction type may be called various terms such as an intra prediction technique or an additional intra prediction mode. For example, the intra prediction type (or the additional intra prediction mode or the like) may include at least one of the aforementioned LIP, PDPC, MRL, and ISP. A general intra prediction method other than specific intra prediction types such as the LIP, the PDPC, the MRL, and the ISP may be called a normal intra prediction type. The normal intra prediction type may be generally applied if the specific intra prediction type is not applied, and the prediction may be performed based on the aforementioned intra prediction mode. Meanwhile, a post-processing filtering for the derived prediction sample may also be performed if necessary.

Specifically, the intra prediction process may include an intra prediction mode/type determination step, neighboring reference samples derivation step, and a prediction sample derivation step based on the intra prediction mode/type. In addition, if necessary, a post-filtering step may be performed on the derived prediction sample.

When the intra prediction is applied, the intra prediction mode applied to the current block may be determined by using the intra prediction mode of the neighboring block. For example, the coding apparatus may select one of the MPM candidates in an MPM (most probable mode) list, which is derived based on the intra prediction mode of the neighboring block (e.g., the left and/or upper neighboring block) of the current block and additional candidate modes, based on the received MPM index, or may select one of the remaining intra prediction modes that are not included in the MPM candidates (and the planar mode) based on the remaining intra prediction mode information. The MPM list may be configured to include or not include the planar mode as a candidate. For example, when the MPM list includes the planar mode as a candidate, the MPM list may have 6 candidates, and when the MPM list does not include the planar mode as a candidate, the MPM list may have 5 candidates. When the MPM list does not include the planar mode as a candidate, a not planar flag (e.g., intra_luma_not_planar_flag) indicating whether the intra prediction mode of the current block is not the planar mode may be signaled. For example, the MPM flag may be signaled first, and the MPM index and the not planar flag may be signaled when the value of the MPM flag is 1. Also, the MPM index may be signaled when the value of the not planar flag is 1. Here, the reason for configuring the MPM list not to include the planar mode as a candidate, is rather than that the planar mode is not the MPM, to first check whether the MPM is in the planar mode by first signaling a flag (not planar flag) because the planar mode is always considered as the MPM.

For example, whether the intra prediction mode applied to the current block is among the MPM candidates (and the planar mode) or the remaining mode may be indicated based on the MPM flag (e.g., intra_luma_mpm_flag). The MPM flag value 1 may indicate that the intra prediction mode for the current block is within MPM candidates (and planar mode), and the MPM flag value 0 may indicate that the intra prediction mode for the current block is not in MPM candidates (and planar mode). The not planar flag (ex. intra_luma_not_planar_flag) value 0 may indicate that the intra prediction mode for the current block is the planar mode, and the not planar flag value 1 may indicate that the intra prediction mode for the current block is not the planar mode. The MPM index may be signaled in the form of an mpm_idx or intra_luma_mpm_idx syntax element, and the remaining intra prediction mode information may be signaled in the form of a rem_intra_luma_pred_mode or intra_luma_mpm_remainder syntax element. For example, the remaining intra prediction mode information may indicate one of the remaining intra prediction modes not included in the MPM candidates (and planar mode) among all intra prediction modes by indexing in the order of prediction mode number. The intra prediction mode may be the intra prediction mode for a luma component (sample). Hereinafter, the intra prediction mode information may include at least one of the MPM flag (ex. intra_luma_mpm_flag), the not planar flag (ex. intra_luma_not_planar_flag), the MPM index (e.g., mpm_idx or intra_luma_mpm_idx), and the remanding intra prediction mode information (rem_intra_luma_pred_mode or intra_luma_mpm_remainder). In this document, the MPM list may be referred to by various terms such as an MPM candidate list and candModeList. When the MIP is applied to the current block, a separate the mpm flag (ex. intra_mip_mpm_flag), the mpm index (cx.

intra_mip_mpm_idx), and the remaining intra prediction mode information (ex. intra_mip_mpm_remainder) for the MIP may be separately signaled, and the not planar flag is not signaled.

In other words, in general, when an image is divided into blocks, a current block to be coded and a neighboring block have similar image characteristics. Therefore, there is a high probability that the current block and the neighboring block have the same or similar intra prediction modes. Accordingly, the encoding apparatus may use the intra prediction mode of the neighboring block to encode the intra prediction mode of the current block.

For example, the encoder/decoder may configure a most probable modes (MPM) list for the current block. The MPM list may be referred to as an MPM candidate list. Here, the MPM may refer to a mode used to improve coding efficiency in consideration of the similarity between the current block and the neighboring blocks during intra prediction mode coding. As mentioned above, the MPM list may be configured including the planar mode, or may be configured except for the planar mode. For example, when the MPM list includes the planar mode, the number of candidates in the MPM list may be six. And, when the MPM list does not include the planar mode, the number of candidates in the MPM list may be five. The encoder/decoder may configure an MPM list including 5 or 6 MPMs.

In order to configure the MPM list, three types of modes can be considered: Default intra modes, Neighbor intra modes, and Derived intra modes. In this case, for the neighboring intra modes, two neighboring blocks, that is, a left neighboring block and an upper neighboring block may be considered.

As described above, if the MPM list is configured not to include the planar mode, the planar mode is excluded from the list, and the number of the MPM list candidates may be set to five.

In addition, among the intra prediction modes, the non-directional mode (or non-angular mode) is the DC mode based on an average of the neighboring reference samples of the current block or the planar mode based on an interpolation-based of the neighboring reference samples.

When inter prediction is applied, the predictor of the encoding apparatus/decoding apparatus may derive prediction samples by performing inter prediction in units of blocks. The inter prediction may be applied when performing the prediction on the current block. That is, the predictor (more specifically, inter predictor) of the encoding/decoding apparatus may derive prediction samples by performing the inter prediction in units of the block. The inter prediction may represent prediction derived by a method dependent to the data elements (e.g., sample values or motion information) of a picture(s) other than the current picture. When the inter prediction is applied to the current block, a predicted block (prediction sample array) for the current block may be derived based on a reference block (reference sample array) specified by the motion vector on the reference picture indicated by the reference picture index. In this case, in order to reduce an amount of motion information transmitted in the inter-prediction mode, the motion information of the current block may be predicted in units of a block, a subblock, or a sample based on a correlation of the motion information between the neighboring block and the current block. The motion information may include the motion vector and the reference picture index. The motion information may further include inter-prediction type (L0 prediction, L1 prediction, Bi prediction, etc.) information. In the case of applying the inter prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list may be configured based on the neighboring blocks of the current block and a flag or index information indicating which candidate is selected (used) may be signaled in order to derive the motion vector and./or reference picture index of the current block. The inter prediction may be performed based on various prediction modes and for example, in the case of a skip mode and a merge mode, the motion information of the current block may be the same as the motion information of the selected neighboring block. In the case of the skip mode, the residual signal may not be transmitted unlike the merge mode. In the case of a motion vector prediction (MVP) mode, the motion vector of the selected neighboring block may be used as a motion vector predictor and a motion vector difference may be signaled. In this case, the motion vector of the current block may be derived by using a sum of the motion vector predictor and the motion vector difference.

The motion information may further include L0 motion information and/or L1 motion information according to the inter-prediction type (L0 prediction, L1 prediction, Bi prediction, etc.). A L0-direction motion vector may be referred to as an L0 motion vector or MVL0 and an L1-direction motion vector may be referred to as an L1 motion vector or MVL1. A prediction based on the L0 motion vector may be referred to as an L0 prediction, a prediction based on the L1 motion vector may be referred to as an L1 prediction, and a prediction based on both the L0 motion vector and the L1 motion vector may be referred to as a bi-prediction. Here, the L0 motion vector may indicate a motion vector associated with a reference picture list L0 and the L1 motion vector may indicate a motion vector associated with a reference picture list L1. The reference picture list L0 may include pictures prior to the current picture in an output order and the reference picture list L1 may include pictures subsequent to the current picture in the output order, as the reference pictures. The prior pictures may be referred to as a forward (reference) picture and the subsequent pictures may be referred to as a reverse (reference) picture. The reference picture list L0 may further include the pictures subsequent to the current picture in the output order as the reference pictures. In this case, the prior pictures may be first indexed in the reference picture list L0 and the subsequent pictures may then be indexed. The reference picture list L1 may further include the pictures prior to the current picture in the output order as the reference pictures. In this case, the subsequent pictures may be first indexed in the reference picture list L1 and the prior pictures may then be indexed. Here, the output order may correspond to a picture order count (POC) order.

Figure 4:
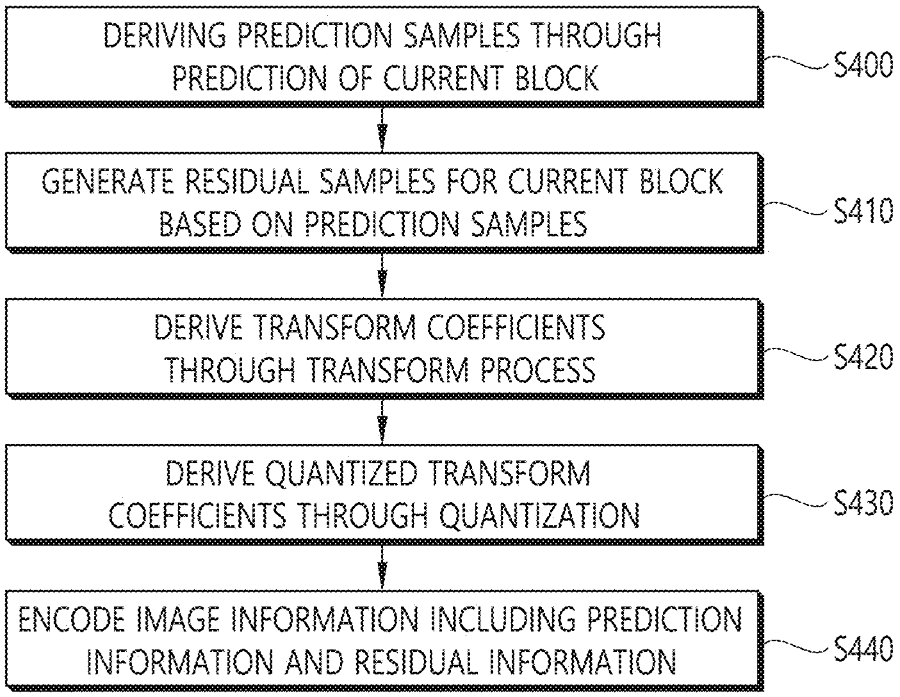
FIG. 4 shows an example of a schematic video/image encoding method to which embodiments of the present disclosure may be applicable.

FIG. 4 illustrates an example of a schematic video/image encoding method to which embodiments of the present document are applicable.

The method disclosed in FIG. 4 may be performed by the above-described encoding apparatus 200 of FIG. 2. Specifically, S400 may be performed by the inter predictor 221 or the intra predictor 222 of the encoding apparatus 200, each of S410, S420, S430 and S440 may be performed by the subtractor 231, the transformer 232, the quantizer 233 and the entropy encoder 240 of the encoding apparatus 200.

Referring to FIG. 4, the encoding apparatus may derive prediction samples through prediction of the current block (S400). The encoding apparatus may determine whether to perform the inter prediction or the intra prediction on the current block, and may determine the specific inter prediction mode or the specific intra prediction mode based on the RD cost. According to the determined mode, the encoding apparatus may derive prediction samples for the current block.

The encoding apparatus may derive residual samples by comparing original samples and the prediction samples for the current block (S410).

The encoding apparatus may derive transform coefficients through a transform process for residual samples (S420), and derive quantize transform coefficients by quantizing on the derived quantized transform coefficients (S430).

The encoding apparatus may encode image information including prediction information and residual information and may output the encoded image information in the form of a bitstream (S440). Prediction information is information related to the prediction process and may include prediction mode information and motion information (e.g., when inter prediction is applied). The residual information may include information about the quantized transform coefficients. Residual information can be entropy coded.

An output bitstream may be stored in a storage medium or transferred to the decoding apparatus via the network.

Figure 5:
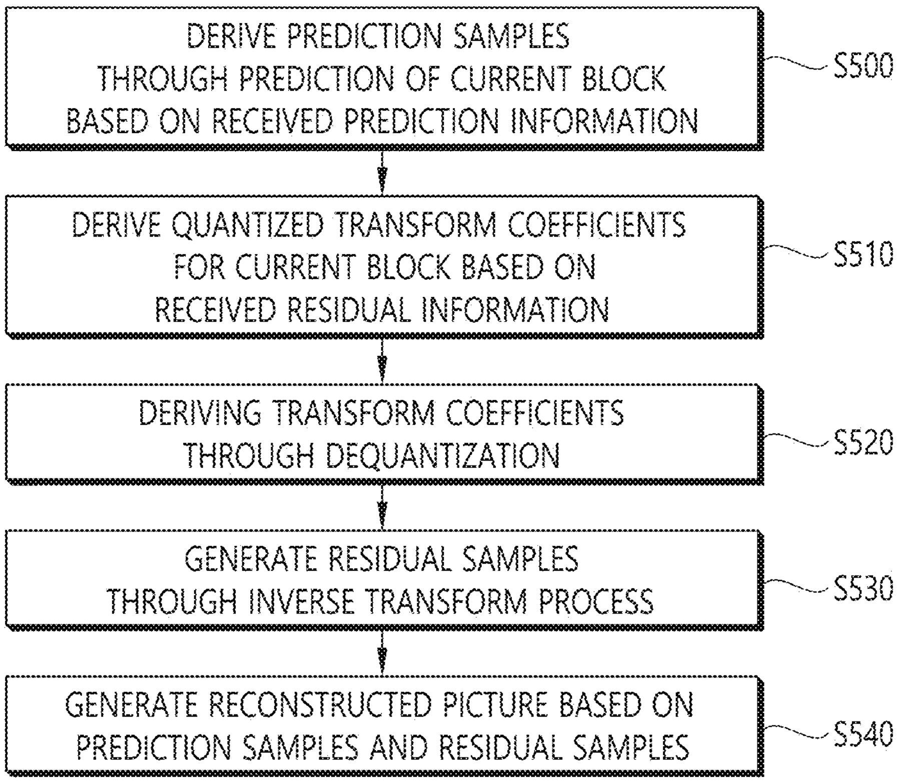
FIG. 5 shows an example of a schematic video/image decoding method to which embodiments of the present disclosure may be applicable.

FIG. 5 shows an example of a schematic video/image decoding method to which embodiments of this document are applicable.

The method disclosed in FIG. 5 may be performed by the decoding apparatus 500 of FIG. 3 described above. Specifically, S500 may be performed by the inter predictor 332 or the intra prediction 331 of the decoding apparatus 300. The process of deriving values of related syntax elements by decoding the prediction information included in the bitstream in S500 may be performed by the entropy decoder 310 of the decoding apparatus 300. S510, S520, S530, and S540 may be performed by the entropy decoder 310, the dequantizer 321, the inverse transformer 322, and the adder 240 of the decoding apparatus 300, respectively.

Referring to FIG. 5, the decoding apparatus may perform an operation corresponding to the operation performed by the encoding apparatus. The decoding apparatus may perform the inter prediction or the intra prediction for the current block based on received prediction information and derive the prediction samples (S500).

The decoding apparatus may derive quantized transform coefficients for the current block based on the received residual information (S510). The decoding apparatus may derive quantized transform coefficients from the residual information through entropy decoding.

The decoding apparatus may dequantize the quantized transform coefficients to derive transform coefficients (S520).

The decoding apparatus derives residual samples through an inverse transform process for the transform coefficients (S530).

The decoding apparatus may generate the reconstruction samples for the current block based on the prediction samples and the residual samples and generate the reconstruction picture based on the generated reconstruction samples (S540). Thereafter, the in-loop filtering process may be further applied to the reconstruction picture as described above.

Meanwhile, as described above, the quantizer of the encoding apparatus may apply quantization to the transform coefficients to derive quantized transform coefficients, and the dequantizer of the encoding apparatus or the dequantizer of the decoding apparatus may derive transform coefficients by applying dequantization to the quantized transform coefficients.

In general, in video/image coding, a quantization rate may be changed, and compression may be adjusted using the changed quantization rate. From an implementation point of view, in consideration of complexity, a quantization parameter (QP) may be used instead of using the quantization rate directly. For example, quantization parameters of integer values from 0 to 63 may be used, and each quantization parameter value may correspond to an actual quantization rate. The quantization parameter ($QP_Y$) for the luma component (luma sample) and the quantization parameter ($QP_C$) for the chroma component (chroma sample) may be set differently.

The quantization process takes a transform coefficient (C) as an input and divides it by a quantization rate (Qstep) to obtain a quantized transform coefficient (C') based on this. In this case, in consideration of computational complexity, a quantization rate is multiplied by a scale to form an integer, and a shift operation may be performed by a value corresponding to the scale value. A quantization scale may be derived based on the product of the quantization rate and the scale value. That is, the quantization scale may be derived according to the QP. The quantization scale may be applied to the transform coefficient (C) to derive a quantized transform coefficient (C') based thereon.

The dequantization process is the inverse process of the quantization process, and a quantized transform coefficient (C') is multiplied by a quantization rate (Qstep), and a reconstructed transform coefficient (C") can be obtained based on this. In this case, a level scale may be derived according to the quantization parameter, and the level scale may be applied to the quantized transform coefficient (C') to derive a reconstructed transform coefficient (C") based on this. The reconstructed transform coefficient (C") may be slightly different from the original transform coefficient (C) due to loss in the transform and/or quantization process. Accordingly, the encoding apparatus performs the dequantization in the same manner as in the decoding apparatus.

In addition, an adaptive frequency weighting quantization technique that adjusts quantization intensity according to frequency may be applied. The adaptive frequency weighting quantization technique is a method of applying different quantization strengths for each frequency. The adaptive frequency weighting quantization may differently apply a quantization intensity for each frequency using a predefined quantization scaling matrix. That is, the above-described quantization/dequantization process may be further performed based on the quantization scaling matrix. For example, different quantization scaling metrics may be used according to the size of the current block and/or whether the prediction mode applied to the current block is the inter prediction or the intra prediction in order to generate a residual signal of the current block. The quantization scaling matrix may be referred to as a quantization matrix or a scaling matrix. The quantization scaling matrix may be predefined. In addition, for frequency adaptive scaling, frequency quantization scale information with respect to the quantization scaling matrix may be configured/encoded in the encoding apparatus and signaled to the decoding apparatus. The frequency quantization scale information may be referred to as quantization scaling information. The frequency quantization scale information may include scaling list data (scaling_list_data). A (modified) quantization scaling matrix may be derived based on the scaling list data. In addition, the frequency quantization scale information may include present flag information indicating whether the scaling list data exists. Alternatively, when the scaling list data is signaled at a higher level (ex. SPS), information indicating whether the scaling list data is modified at a lower level (ex. PPS or tile group header etc.) may be further included.

As described above, the scaling list data may be signaled to indicate a (frequency-based quantization) scaling matrix used for quantization/dequantization.

Signaling support of default and user-defined scaling matrix exists in the HEVC standard and is currently adopted in the VVC standard. However, for the VVC standard, additional support for signaling of the following functions has been incorporated.

- Three modes for scaling matrix: OFF, DEFAULT, USER_DEFINED
- Larger size range for blocks (4×4 to 64×64 for luma, 2×2 to 32×32 for chroma)
- Rectangle Transform Blocks (TBs)
- Dependent quantization
- Multiple Transform Selection (MTS)
- Large transforms with zeroing-out high frequency coefficients
- Intra sub-block partitioning (ISP)
- Intra Block Copy (IBC) (also called current picture referencing (CPR))
- DEFAULT scaling matrix for all TB sizes, default value is 16

It should be noted that the scaling matrix should not be applied to Transform Skip (TS) and Secondary Transform (ST) for all sizes.

Hereinafter, a High Level Syntax (HSL) structure for supporting a scaling list in the VVC standard will be described in detail. First, a flag may be signaled through a Sequence Parameter Set (SPS) to indicate that a scaling list is available for a current coded video sequence (CVS) being decoded. Then, if the flag is available, an additional flag may be parsed to indicate whether specific data is present in the scaling list in the SPS. This can be shown in Table 1.

Table 1 is an excerpt from SPS to describe the scaling list for CVS.

TABLE 1

| seq_parameter_set_rbsp( ) } | Descriptor |
|---|---|
| . . . | |
| scaling_list_enabled_flag | u(1) |
| if( scaling_list_enabled_flag ) { | |
| sps_scaling_list_data_present_flag | u(1) |
| if( sps_scaling_list_data_present_flag ) | |
| scaling_list_data( ) | |
| } | |
| . . . | |
| } | |

Semantics of syntax elements included in the SPS syntax of Table 1 may be shown in Table 2 below.

TABLE 2

| |
|---|
| scaling_list_enabled_flag equal to 1 specifies that a scaling list is used for the scaling process for transform coefficients. scaling_list_enabled_flag equal to 0 specifies that scaling list is not used for the scaling process for transform coefficients. |
| sps_scaling_list_data_present_flag equal to 1 specifies that the scaling_list_data( ) syntax structure is present in the SPS. sps_scaling_list_data_present_flag equal to 0 specifies that the scaling list data( ) syntax structure is not present in the SPS. When not present, the value of sps_scaling_list_data_present_flag is inferred to be equal to 0. |

Referring to Table 1 and Table 2 above, scaling_list_enabled_flag may be signaled from the SPS. For example, if the value of scaling_list_enabled_flag is 1, it may indicate that the scaling list is used in the scaling process for the transform coefficient, and if the value of scaling_list_enabled_flag is 0, it may indicate that the scaling list is not used in the scaling process for the transform coefficient. In this case, when the value of scaling_list_enabled_flag is 1, sps_scaling_list_data_present_flag may be further signaled from the SPS. For example, when the value of sps_scaling_list_data_present_flag is 1, it may indicate that scaling_list_data ( ) syntax structure is present in the SPS, and when the value of sps_scaling_list_data_present_flag is 0, it may indicate that the scaling_list_data( ) syntax structure is not present in the SPS. If sps_scaling_list_data_present_flag does not exist, the value of sps_scaling_list_data_present_flag may be inferred to be 0.

Also, a flag (e.g., pps_scaling_list_data_present_flag) may be parsed first in a picture parameter set (PPS). If this flag is available, scaling_list_data( ) can be parsed in the PPS. If scaling_list_data( ) is initially present in the SPS and later parsed in the PPS, data in the PPS may take precedence over data in the SPS. Table 3 below is an excerpt from the PPS to describe the scaling list data.

TABLE 3

| pic_parameter_set_rbsp( ) { | Descriptor |
|---|---|
| . . . | |
| pps_scaling_list_data_present_flag | u(1) |
| if( pps_scaling_list_data_present_flag ) | |
| scaling_list_data( ) | |
| } | |
| . . . | |
| } | |

Semantics of syntax elements included in the PPS syntax of Table 3 may be shown in Table 4 below.

TABLE 4

| |
|---|
| pps_scaling_list_data_present_flag equal to 1 specifies that the scaling list data used for the pictures referring to the PPS are derived based on the scaling lists specified by the active SPS and the scaling lists specified by the PPS. pps_scaling_list_data_present_flag equal to 0 specifies that the scaling list data used for the pictures referring to the PPS are inferred to be equal to those specified by the active SPS. When scaling_list_enabled_flag is equal to 0, the value of pps_scaling_list_data_present_flag shall be equal to 0. When scaling_list_enabled_flag is equal to 1, sps_scaling_list_data_present_flag is equal to 0 and pps_scaling_list_data_present_flag is equal to 0, the default scaling list data are used to derive the array ScalingFactor as described in the scaling list data semantics. |

Referring to Table 3 and Table 4, pps_scaling_list_data_present_flag may be signaled from the PPS. For example, when the value of pps_scaling_list_data_present_flag is 1, it may indicate that the scaling list data used for pictures referencing the PPS is derived based on the scaling list specified by the active SPS and the scaling list specified by the PPS. When the value of pps_scaling_list_data_present_flag is 0, it may indicate that the scaling list data used for pictures referencing the PPS is inferred to be the same as the scaling list specified by the active SPS. At this time, when the value of scaling_list_enabled_flag is 0, the value of pps_scaling_list_data_present_flag should be 0. When the value of scaling_list_enabled_flag is 1, the value of sps_scaling_list_data_present_flag is 0, and the value of pps_scaling_list_data_present_flag is 0, the default scaling list data can be used to derive a scaling factor array as described in the scaling list data semantics.

The scaling list may be defined in the VVC standard for the following quantization matrix sizes. This can be shown in Table 5 below. The range of support for quantization matrices has been extended to include 2×2 and 64×64 as well as 4×4, 8×8, 16×16 and 32×32 in the HEVC standard.

TABLE 5

| Size of quantization matrix | sizeId |
|---|---|
| 1 × 1 | 0 |
| 2 × 2 | 1 |
| 4 × 4 | 2 |
| 8 × 8 | 3 |
| 16 × 16 | 4 |
| 32 × 32 | 5 |
| 64 × 64 | 6 |

Table 5 defines sizeId for all quantization matrix sizes used. matrixId can be assigned for different combinations of sizeId, a prediction mode of the coding unit (CuPredMode), and color component using the above combination. Here, CuPredMode that can be considered may be inter, intra, and IBC (Intra Block Copy). Intra mode and IBC mode may be treated the same. Thus, the same matrixId(s) can be shared for a given color component. Here, the color components that can be considered may be luma (Luma(Y)) and two color components (Cb and Cr). The allocated matrixId can be represented as shown in Table 6 below.

Table 6 shows matrixId according to sizeId, prediction mode, and color component.

TABLE 6

| sizeId | CuPredMode | cIdx (Colour component) | matrixId |
|---|---|---|---|
| 2, 3, 4, 5, 6 | MODE_INTRA | 0 (Y) | 0 |
| 1, 2, 3, 4, 5 | MODE_INTRA | 1 (Cb) | 1 |
| 1, 2, 3, 4, 5 | MODE_INTRA | 2 (Cr) | 2 |
| 2, 3, 4, 5, 6 | MODE_INTER | 0 (Y) | 3 |
| 1, 2, 3, 4 , 5 | MODE_INTER | 1 (Cb) | 4 |
| 1, 2, 3, 4, 5 | MODE_INTER | 2 (Cr) | 5 |
| 2, 3, 4, 5, 6 | MODE_IBC | 0 (Y) | 0 |
| 1, 2, 3, 4, 5 | MODE_IBC | 1 (Cb) | 1 |
| 1, 2, 3, 4, 5 | MODE_IBC | 2 (Cr) | 2 |

Table 7 below shows an example of a syntax structure for scaling list data (e.g., scaling_list_data( ))

TABLE 7

| scaling_list_data( ) { | Descriptor |
|---|---|
| for( sizeId = 1; sizeId < 7; sizeId++ ) | |
| for( matrixId = 0; matrixId < 6; matrixId ++ ) { | |
| if( ! ( (( sizeId == 1 ) && ( matrixId % 3 == 0 ) ) \|\| (( sizeId == 6) && ( matrixId % 3 != 0 ) )) ) { | |
| scaling_list_pred_mode_flag[ sizeId ][ matrixId ] | u(1) |
| if( !scaling_list_pred_mode_flag[ sizeId ][ matrixId ] ) | |
| scaling_list_pred_matrix_id_delta[ sizeId ][ matrixId ] | ue(v) |
| else { | |
| nextCoef = 8 | |
| coefNum = Min( 64, ( 1 << ( sizeId << 1 ) ) ) | |
| if( sizeId > 3) { | |
| scaling_list_dc_coef_minus8[ sizeId − 4][ matrixId ] | se(v) |
| nextCoef = scaling_list_dc_coef_minus8[ sizeId − 4 ][ matrixId ] + 8 | |
| } | |
| for( i = 0; i < coefNum; i ++ ) { | |

TABLE 7-continued

```
scaling_list_data( ) {                                              Descriptor
                x = DiagScanOrder[ 3 ][ 3 ][ i ][ 0 ]
                y = DiagScanOrder[ 3 ][ 3 ][ i ][ 1 ]
                if ( !(sizeId==6 && x>=4 && y>=4) ) {
                  scaling_list_delta_coef                             se(v)
                  nextCoef =
                  ( nextCoef + scaling_list_delta_coef + 256) % 256
                  ScalingList[ sizeId ][ matrixId ][ i ] = nextCoef
                }
              }
            }
          }
        }
      }
}
```

The semantics of syntax elements included in the syntax of Table 7 may be shown in Table 8 below.

TABLE 8 scaling_list_pred_mode_flag[ sizeId ][ matrixId ] equal to 0 specifies that the values of the scaling list are the same as the values of a reference scaling list. The reference scaling list is specified by scaling_list_pred_matrix_id_delta[ sizeId ][ matrixId ].

scaling_list_pred_mode_flag[ sizeId ][ matrixId ] equal to 1 specifies that the values of the scaling list are explicitly signalled.

scaling_list_pred_matrix_id_delta[ sizeId ][ matrixId ] specifies the reference scaling list used to derive ScalingList[ sizeId ][ matrixId ], the derivation of ScalingList[ sizeId ][ matrixId ] is based on scaling_list_pred_matrix_id_delta[ sizeId ][ matrixId ] as follows:

−If scaling_list_pred_matrix_id_delta[ sizeId ][ matrixId ] is equal to 0, the scaling list is inferred from the default scaling list ScalingList[ sizeId ][ matrixId ][ i ] as specified in Tables 13-16 for i = 0 Min( 63, ( 1 << ( sizeId << 1 ) ) − 1 ).

−Otherwise, the scaling list is inferred from the reference scaling list as follows:

```
  For sizeId =1 . . . 6,
  refMatrixId = matrixId -
     scaling list_pred_matrix_id_delta[ sizeId ][ matrixId ] * (sizeId == 6 ? 3 :1)
```

If sizeId is equal to 1, the value of refMatrixId shall not be equal to 0 or 3. Otherwise, if sizeId is less than or equal to 5, the value of scaling_list_pred_matrix_id_delta[ sizeId ][ matrixId ] shall be in the range of 0 to matrixId, inclusive. Otherwise (sizeId is equal to 6), the value of scaling_list_pred_matrix_id_delta[ sizeId ][ matrixId ] shall be in the range of 0 to matrixId / 3, inclusive.

scaling_list_dc_coef_minus8[ sizeId ][ matrixId ] plus 8 specifies the value of the variable ScalingFactor[ 4 ][ matrixId ][ 0 ][ 0 ] for the scaling list for the 16x16 size when sizeId is equal to 4 and specifies the value of ScalingFactor[ 5 ][ matrixId ][ 0 ][ 0 ] for the scaling list for the 32x32 size when sizeId is equal to 5, and specifies the value of ScalingFactor[ 6 ][ matrixId ][ 0 ][ 0 ] for the scaling list for the 64x64 size when sizeId is equal to 6. The value of scaling_list_dc_coef_minus8[ sizeId ][ matrixId ] shall be in the range of −7 to 247, inclusive.

When scaling_list_pred_mode_flag[ sizeId ][ matrixId ] is equal to 0, scaling_list_pred_matrix_id_delta[ sizeId ][ matrixId ] is equal to 0 and sizeId is greater than 3, the value of scaling_list_dc_coef_minus8[ sizeId ][ matrixId ] is inferred to be equal to 8.

When sealing_list_pred_matrix_id_delta[ sizeId ][ matrixId ] is not equal to 0 and sizeId is greater than 3, the value of scaling_list_dc_coef_minus8[ sizeId ][ matrixId ] is inferred to be equal to scaling_list_dc_coef_minus8[ sizeId ][ refMatrixId ].

scaling_list_delta_coef specifies the difference between the current matrix coefficient ScalingList[ sizeId ][ matrixId ][ i ] and the previous matrix coefficient ScalingList[ sizeId ][ matrixId ][ i − 1 ], when scaling_list_pred_mode_flag[ sizeId ][ matrixId ] is equal to 1. The value of scaling_list_delta_coef shall be in the range of −128 to 127, inclusive. The value of ScalingList[ sizeId ][ matrixId ][ i ] shall be greater than 0. When scaling_list_pred_mode_flag[ sizeId ][ matrixId ] is equal to 1 and scaling_list_delta_coef is not present, the value of ScalingList[ sizeId ][ matrixId ][ i ] is inferred to be 0.

Referring to Table 7 and Table 8, in order to extract scaling list data (e.g., scaling_list_data( ), for all sizeId from 1 to 6 and matrixId from 0 to 5, the scaling list data can be applied to 2×2 chroma component and 64×64 luma component. Then, a flag (e.g., scaling_list_pred_mode_flag) may be parsed to indicate whether the value of the scaling list is the same as the value of the reference scaling list. The reference scaling list may be represented by scaling_list_pred_matrix_id_delta[sizeId][matrixId]. However, when scaling_list_pred_mode_flag[sizeId][matrixId] is 1, scaling list data may be explicitly signaled. When scaling_list_pred_matrix_id_delta is 0, DEFAULT mode with default value may be used as shown in Tables 9 to 12. For other values of scaling_list_pred_matrix_id_delta, as shown in the semantics of Table 8, refMatrixId may be determined first.

In explicit signaling, that is, in a USER_DEFINED mode, the maximum number of signaled coefficients may be determined first. In the case of quantization block sizes of 2×2, 4×4 and 8×8, all coefficients can be signaled. For sizes greater than 8×8, i.e., 16×16, 32×32 and 64×64, only 64 coefficients can be signaled. That is, an 8×8 base matrix may be signaled and the remaining coefficients may be upsampled from the base matrix.

The following Table 9 is an example showing the default value of ScalingList[1][matrixId][i](i=0 . . . 3)

TABLE 9

| i | 0 | 1 | 2 | 3 |
|---|---|---|---|---|
| ScalingList[ 1 ][1, 2, 4, 5][ i ] | 16 | 16 | 16 | 16 |

The following Table 10 is an example showing the default value of ScalingList[2][matrixId][i](i=0 . . . 15).

TABLE 10

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 2 ][ 0 . . . 5 ][ i ] | 16 | 16 | 16 | 16 | 16 | 16 | 16 | 16 | 16 | 16 | 16 | 16 | 16 | 16 | 16 | 16 |

Table 11 below is an example showing the default value of ScalingList[3 . . . 5][matrixId][i](i=0 . . . 63).

TABLE 11

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 3 . . . 5 ][ 0 . . . 5 ][ i ] | 16 | 16 | 16 | 16 | 16 | 16 | 16 | 16 | 16 | 16 | 16 | 16 | 16 | 16 | 16 | 16 |
| i-16 | 0 | 1 | 2 | 3 | 4 | 5 | 6 | 7 | 8 | 9 | 10 | 11 | 12 | 13 | 14 | 15 |
| ScalingList[ 3 . . . 5 ][ 0 . . . 5 ][ i ] | 16 | 16 | 16 | 16 | 16 | 16 | 16 | 16 | 16 | 16 | 16 | 16 | 16 | 16 | 16 | 16 |
| i-32 | 0 | 1 | 2 | 3 | 4 | 5 | 6 | 7 | 8 | 9 | 10 | 11 | 12 | 13 | 14 | 15 |
| ScalingList[ 3 . . . 5 ][ 0 . . . 5 ][ i ] | 16 | 16 | 16 | 16 | 16 | 16 | 16 | 16 | 16 | 16 | 16 | 16 | 16 | 16 | 16 | 16 |
| i-48 | 0 | 1 | 2 | 3 | 4 | 5 | 6 | 7 | 8 | 9 | 10 | 11 | 12 | 13 | 14 | 15 |
| ScalingList[ 3 . . . 5 ][ 0 . . . 5 ][ i ] | 16 | 16 | 16 | 16 | 16 | 16 | 16 | 16 | 16 | 16 | 16 | 16 | 16 | 16 | 16 | 16 |

The following Table 12 is an example showing the default value of ScalingList[6][matrixId][i](i=0 . . . 63).

TABLE 12

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 6 ][ 0, 3 ][ i ] | 16 | 16 | 16 | 16 | 16 | 16 | 16 | 16 | 16 | 16 | 16 | 16 | 16 | 16 | 16 | 16 |
| i-16 | 0 | 1 | 2 | 3 | 4 | 5 | 6 | 7 | 8 | 9 | 10 | 11 | 12 | 13 | 14 | 15 |
| ScalingList[ 6 ][ 0, 3 ][ i ] | 16 | 16 | 16 | 16 | 16 | 16 | 16 | 16 | 16 | 16 | 16 | 16 | 16 | 16 | 16 | 16 |
| i-32 | 0 | 1 | 2 | 3 | 4 | 5 | 6 | 7 | 8 | 9 | 10 | 11 | 12 | 13 | 14 | 15 |
| ScalingList[ 6 ][ 0, 3 ][ i ] | 16 | 16 | 16 | 16 | 16 | 16 | 16 | 16 | 16 | 16 | 16 | 16 | 16 | 16 | 16 | 16 |
| i-48 | 0 | 1 | 2 | 3 | 4 | 5 | 6 | 7 | 8 | 9 | 10 | 11 | 12 | 13 | 14 | 15 |
| ScalingList[ 6 ][ 0, 3 ][ i ] | 16 | 16 | 16 | 16 | 16 | 16 | 16 | 16 | 16 | 16 | 16 | 16 | 16 | 16 | 16 | 16 |

As described above, the default scaling list data may be used to derive the scaling factor (ScalingFactor).

Scaling factor of 5-dimensional array ScalingFactor[sizeId][sizeId][matrixId][x][y] (where x, y=0 . . . (1<<sizeId)−1) may represent an array of scaling factors according to the variable sizeId shown in Table 5 and the variable matrixId shown in Table 6 above.

The following Table 13 shows examples of deriving a scaling factor according to a size of a quantization matrix based on the default scaling list described above.

TABLE 13

The elements of the quantization matrix of size 2x2, ScalingFactor[ 1 ][ matrixId ][ ][ ], are derived as follows:

ScalingFactor[ 1 ][ 1 ][ matrixId ][ x ][ y ] = ScalingList[ 1 ][ matrixId ][ i ]
with i = 0..3, matrixId = 1, 2, 4, 5, x = DiagScanOrder[ 1 ][ 1 ][ i ][ 0 ], and
y = DiagScanOrder[ 1 ] [ 1 ][ i ][ 1 ]

TABLE 13-continued

The elements of the quantization matrix of size 4x4, ScalingFactor[ 2 ][matrixId ][ ][ ], are derived as follows:
ScalingFactor[ 2 ][ 2 ][ matrixId ][ x ][ y ] = ScalingList[ 2 ][ matrixId ][ i ]
with i = 0..15, matrixId = 0..5, x = DiagScanOrder[ 2 ][ 2 ][ i ][ 0 ], and
y = DiagScanOrder[ 2 ][ 2 ][ i ][ 1 ]
The elements of the quantization matrix of size 8x8, ScalingFactor[ 3 ][ matrixId ][ ][ ], are derived as follows:
ScalingFactor[ 3 ][ 3 ][ matrixId ][ x ][ y ] = ScalingList[ 3 ][ matrixId ][ i ]
with i = 0..63, matrixId = 0..5, x = DiagScanOrder[ 3 ][ 3 ][ i ][ 0 ], and
y = DiagScanOrder[ 3 ][ 3 ][ i ][ 1 ]
The elements of the quantization matrix of size 16x16, ScalingFactor[ 4 ][ matrixId ][ ][ ], are derived as follows:
ScalingFactor[ 4 ][ 4 ][ matrixId ][ x * 2 + k ] [ y * 2 + j ] =
ScalingList[ 4 ][ matrixId ][ i ] with i = 0..63, j = 0..1, k = 0..1, matrixId = 0..5,
x = DiagScanOrder[ 3 ][ 3 ][ i ][ 0 ], and y = DiagScanOrder[ 3 ][ 3 ][ i ][ 1 ]
ScalingFactor[ 4 ][ 4 ][ matrixId ][ 0 ][ 0 ] =
scaling_list_dc_coef_minus8[ 0 ][ matrixId ] + 8 with matrixId = 0..5
The elements of the quantization matrix of size 32x32, ScalingFactor[ 5 ][ matrixId ][ ][ ], are derived as follows:
ScalingFactor[ 5 ][ 5 ][ matrixId ][ x * 4 + k ][ y * 4 + j ] =
ScalingList[ 5 ][ matrixId ][ i ] with i = 0..63, j = 0..3, k = 0..3, matrixId = 0..5,
x = DiagScanOrder[ 3 ][ 3 ][ i ][ 0 ], and y = DiagScanOrder[ 3 ][ 3 ][ i ][ 1 ]
ScalingFactor[ 5 ][ 5 ][ matrixId ][ 0 ][ 0 ] =
scaling_list_dc_coef_minus8[ 1 ][ matrixId ] + 8 with matrixId = 0..5
The elements of the quantization matrix of size 64x64, ScalingFactor[ 6 ][ matrixId ][ ][ ], are derived as follows:
ScalingFactor[ 6 ][ 6 ][ matrixId ][ x * 8 + k ][ y * 8 + j ] =
ScalingList[ 6 ][ matrixId ][ i ] with i = 0..63, j = 0..7, k = 0..7, matrixId = 0, 3,
x = DiagScanOrder[ 3 ][ 3 ][ i ][ 0 ], and y = DiagScanOrder[ 3 ][ 3 ][ i ][ 1 ]
ScalingFactor[ 6 ][ 6 ][ matrixId ][ 0 ][ 0 ] =
scaling_list_dc_coef_minus8[ 2 ][ matrixId ] + 8 with matrixId = 0, 3
When ChromaArrayType is equal to 3, the elements of the chroma quantization matrix of size 64x64, ScalingFactor[ 6 ][ 6 ][ matrixId ][ ][ ], with matrixId = 1, 2, 4 and 5 are derived as follows:
ScalingFactor[ 6 ][ 6 ][ matrixId ][ x * 8 + k ][ y * 8 + j ] =
ScalingList[ 5 ][ matrixId ][ i ] with i = 0..63, j = 0..7, k = 0..7,
x = DiagScanOrder[ 3 ][ 3 ][ i ][ 0 ], and y = DiagScanOrder[ 3 ][ 3 ][ i ][ 1 ]
ScalingFactor[ 6 ][ 6 ][ matrixId ][0 ][0] =
scaling_list_dc_coef_minus8[ 1 ][ matrixId ] + 8

For a quantization matrix of rectangular size, the scaling factor of a 5-dimensional array ScalingFactor[sizeIdW][sizeIdH][matrixId][x][y], where x=0 . . . (1<<sizeIdW)−1, y=0 . . . (1<<sizeIdH)−1, sizeIdW!=sizeIdH) may represent an array of scaling factors according to the variables sizeIdW and sizeIdH shown in Table 15 below, and may be derived as shown in Table 14 below.

TABLE 14

ScalingFactor[ sizeIdW ][ sizeIdH ][ matrixId ][ x ][ y ] can be generated by ScalingList[ sizeLId ][ matrixId ][ i ]
with sizeLId = max( sizeIdW, sizeIdH ), sizeIdW = 0,1..6, sizeIdH = 0,1..6, matrixId = 0..5, x = 0.. ( 1 << sizeIdW) − 1, y = 0.. ( 1 << sizeIdH ) − 1, x = DiagScanOrder[ k ][ k ][ i ][ 0 ], and y = DiagScanOrder[ k ][ k ][ i ][ 1 ], k = min(sizeLId, 3),
and ratioW = (1<<sizeIdW)/(1<<k), ratioH = (1<<sizeIdH)/(1<<k), and ratioWH = (1<<abs(sizeIdW−sizeIdH)), as the following rules:
- If (sizeIdW>sizeIdH)
ScalingFactor[ sizeIdW ][ sizeIdH ][ matrixId ][ x ][ y ]
= ScalingList[ sizeLId ][ matrixId ][ Raster2Diag[(1<<k)*((y*ratioWH)/ratioW) + x/ratioW]]
- else
ScalingFactor[ sizeIdW ][ sizeIdH ][ matrixId ][ x ][ y ]
= ScalingList[ sizeLId ][ matrixId ][ Raster2Diag[(1<<k)*(y/ratioH) + (x*ratioWH)/ratioH]],
Where Raster2Diag[] is the function converting raster scan position in one 8x8 block to diagonal scan position The square-sized quantization matrix shall be zeroed for samples that satisfy the following conditions.

$$x > 32$$

$$y > 32$$

The decoded TU is not coded with a default transform mode, (1<<sizeIdW)==32 and x>16

The decoded TU is not coded with a default transform mode, (1<<sizeIdH)==32 and y>16

The following Table 15 shows an example of sizeIdW and sizeIdH according to the size of the quantization matrix.

TABLE 15

| Size of quantization matrix | sizeIdW | sizeIdH |
|---|---|---|
| 1 | 0 | 0 |
| 2 | 1 | 1 |
| 4 | 2 | 2 |
| 8 | 3 | 3 |
| 16 | 4 | 4 |
| 32 | 5 | 5 |
| 64 | 6 | 6 |

Hereinafter, this document proposes a method for efficiently signaling scaling list data in applying an adaptive frequency weighting quantization technique in a quantization/dequantization process.

Figure 6:
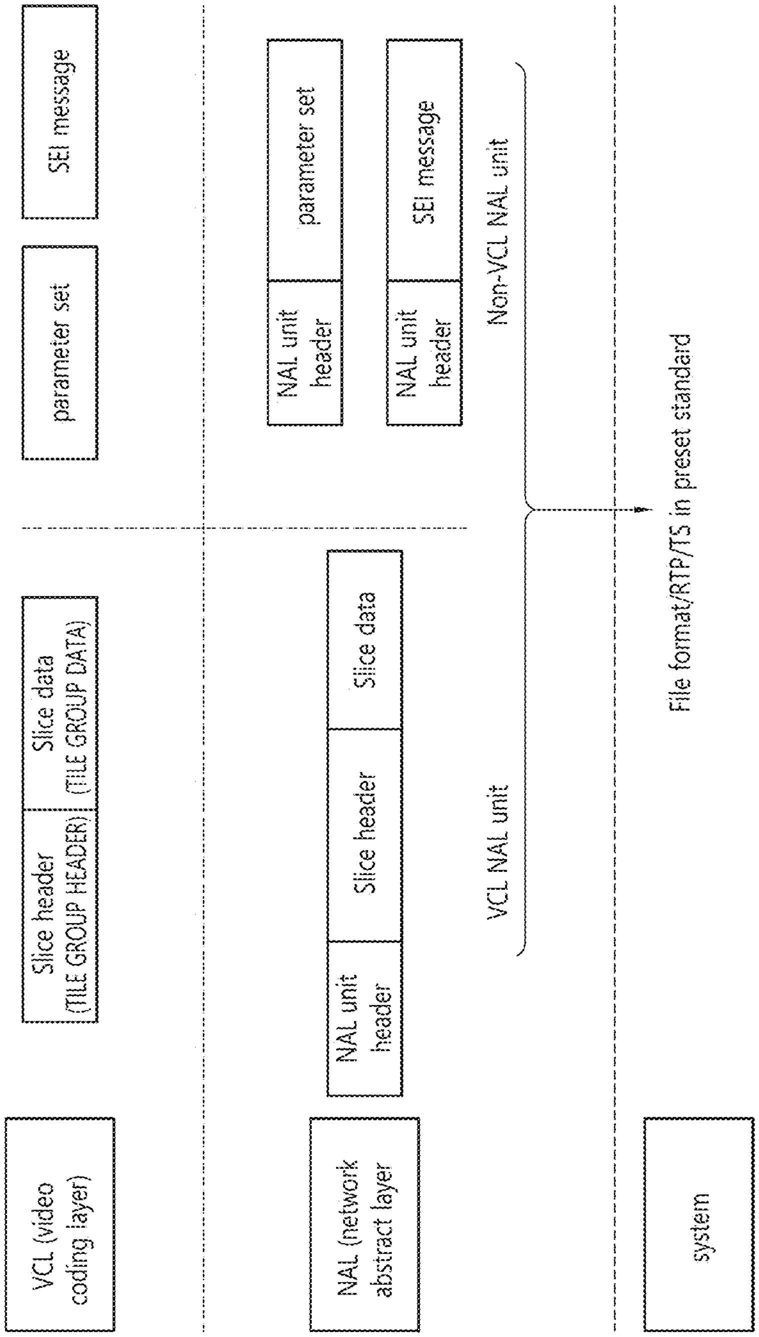
FIG. 6 exemplarily shows a hierarchical structure for a coded image/video.

FIG. 6 exemplarily shows a hierarchical structure for a coded image/video.

Referring to FIG. 6, the coded image/video is divided into VCL (video coding layer) that deals with an image/video decoding process and itself, a subsystem that transmits and stores the coded information, and a network abstraction layer (NAL) that exists between the VCL and subsystems and is responsible for network adaptation functions.

The VCL may generate VCL data including compressed image data (slice data), or generate parameter sets including a picture parameter set (Picture Parameter Set: PPS), a sequence parameter set (Sequence Parameter Set: SPS), a video parameter set (Video Parameter Set: VPS) etc. or a supplemental enhancement information (SEI) message additionally necessary for the decoding process of an image.

In the NAL, a NAL unit may be generated by adding header information (NAL unit header) to a raw byte sequence payload (RBSP) generated in the VCL. In this case, the RBSP refers to slice data, parameter sets, SEI messages, etc. generated in the VCL. The NAL unit header may include NAL unit type information specified according to RBSP data included in the corresponding NAL unit.

Further, the NAL unit may be divided into a VCL NAL unit and a Non-VCL NAL unit according to the RBSP generated in the VCL. The VCL NAL unit may mean a NAL unit including information (sliced data) about an image, and the Non-VCL NAL unit may mean a NAL unit containing information (parameter set or SEI message) necessary for decoding an image.

The above-described VCL NAL unit and Non-VCL NAL unit may be transmitted through a network by attaching header information according to a data standard of the subsystem. For example, the NAL unit may be transformed into a data form of a predetermined standard such as H.266/VVC file format, Real-time Transport Protocol (RTP), Transport Stream (TS), etc. and transmitted through various networks.

As described above, in the NAL unit, the NAL unit type may be specified according to the RBSP data structure included in the corresponding NAL unit, and information on this NAL unit type may be stored and signaled in the NAL unit header.

For example, the NAL unit may be roughly classified into the VCL NAL unit type and the Non-VCL NAL unit type depending on whether the NAL unit includes information about the image (slice data). The VCL NAL unit type may be classified according to property and a type of a picture included in the VCL NAL unit, and the Non-VCL NAL unit type may be classified according to the type of a parameter set.

The following is an example of the NAL unit type specified according to the type of parameter set included in the Non-VCL NAL unit type.

- APS (Adaptation Parameter Set) NAL unit: Type for NAL unit including APS
- DPS (Decoding Parameter Set) NAL unit: Type for NAL unit including DPS
- VPS (Video Parameter Set) NAL unit: Type for NAL unit including VPS
- SPS (Sequence Parameter Set) NAL unit: Type for NAL unit including SPS
- PPS (Picture Parameter Set) NAL unit: Type for NAL unit including PPS
- PH (Picture header) NAL unit: Type for NAL unit including PH The above-described NAL unit types have syntax information for the NAL unit type, and the syntax information may be stored and signaled in a NAL unit header. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. In this document, a slice may be mixed or replaced with a tile group. Also, in this document, a slice header may be mixed or replaced with a type group header.

The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to multiple layers. The DPS (DPS syntax) may include information/parameters commonly applicable to the entire video. The DPS may include information/parameters related to concatenation of a coded video sequence (CVS). In this document, high level syntax (HLS) may include at least one of the APS syntax, PPS syntax, SPS syntax, VPS syntax, DPS syntax, picture header syntax, and slice header syntax.

In this document, the image/video information encoded in the encoding apparatus and signaled in the form of a bitstream to the decoding apparatus may include, as well as picture partitioning-related information in the picture, intra/inter prediction information, residual information, in-loop filtering information, etc. the information included in the slice header, the information included in the picture header, the information included in the APS, the information included in the PPS, the information included in the SPS, the information included in the VPS, and/or the information included in the DPS. In addition, the image/video information may further include information of the NAL unit header.

On the other hand, APS (Adaptation Parameter Set) is used in the VVC standard to transmit information for ALF (Adaptive Loop Filter) and LMCS (Luma Mapping with Chroma Scaling) process. In addition, the APS has an extensible structure so that it can be used to transmit other data structures (i.e., different syntax structures). Accordingly, this document proposes a method of parsing/signaling scaling list data used for frequency weighting quantization through the APS.

The scaling list data is quantization scale information for the frequency weighting quantization that can be applied in the quantization/dequantization process as described above, and may be a list that associates a scale factor with each frequency index.

As an embodiment, the following Table 16 shows an example of an adaptation parameter set (APS) structure used to transmit scaling list data.

TABLE 16

| adaptation_parameter_set_rbsp( ) { | Descriptor |
|---|---|
| adaptation_parameter_set_id | u(5) |
| aps_params_type | u(3) |
| if( aps_params_type = = ALF_APS ) // 0 | |
| alf_data( ) | |
| else if ( aps_params_type = = LMCS_APS ) // 1 | |

TABLE 16-continued

| adaptation_parameter_set_rbsp( ) { | Descriptor |
|---|---|
| lmcs_data( ) | |
| else if ( aps_params_type = = SCALING_APS) // 2 | |
| scaling_list_data( ) | |
| aps_extension_flag | u(1) |
| if( aps_extension_flag ) | |
| while( more_rbsp_data( ) ) | |
| aps_extension_data_flag | u(1) |
| rbsp_trailing_bits( ) | |
| } | |

Semantics of syntax elements included in the APS syntax of Table 16 may be shown in Table 17 below.

TABLE 17 adaptation_parameter_set_id provides an identifier for the APS for reference by other syntax elements.
NOTE - APSs can be shared across pictures and can be different in different tile groups within a picture.
aps_extension_flag equal to 0 specifies that no aps_extension_data_flag syntax elements are present in the APS RBSP syntax structure. aps_extension_flag equal to 1 specifies that there are aps_extension_data_flag syntax elements present in the APS RBSP syntax structure.
aps_extension_data_flag may have any value. Its presence and value do not affect decoder conformance to profiles specified in this version of this Specification. Decoders conforming to this version of this Specification shall ignore all aps_extension_data_flag syntax elements.
aps_params_type specifies the type of APS parameters carried in the APS as specified in the Table 19 shown below.

Referring to Table 16 and Table 17, adaptation_parameter_set_id syntax element may be parsed/signaled in the APS. adaptation_parameter_set_id provides an identifier for the APS for reference of other syntax elements. That is, the APS may be identified based on the adaptation_parameter_set_id syntax element. The adaptation_parameter_set_id syntax element may be called APS ID information. The APS may be shared between pictures and may be different in different tile groups within a picture.

In addition, aps_params_type syntax element may be parsed/signaled in the APS. aps_params_type may indicate the type of the APS parameter transmitted from the APS as shown in Table 18 below. The aps_params_type syntax element may be referred to as APS parameter type information or APS type information.

For example, the following Table 18 is an example showing the types of APS parameters that can be transmitted through the APS, and each APS parameter type may be indicated in correspondence with a value of aps_params_type.

TABLE 18

| aps_params_type | Name of aps_params_type | Type of APS parameters |
|---|---|---|
| 0 | ALF_APS | ALF parameters |
| 1 | LMCS_APS | LMCS parameters |
| 2 | SCALING_APS | SCALING list data parameters |
| 3 . . . 7 | Reserved | Reserved |

Referring to Table 18, aps_params_type may be a syntax element for classifying the type of the corresponding APS. When the value of aps_params_type is 0, the corresponding APS type may be ALF_APS, the corresponding APS may carry ALF data, and the ALF data may include ALF parameters for deriving filter/filter coefficients. When the value of aps_params_type is 1, the corresponding APS type may be LMCS_APS, the corresponding APS may carry LMCS data, and the LMCS data may include LMCS parameters for deriving an LMCS model/bins/mapping index. When the value of aps_params_type is 2, the corresponding APS type may be SCALING_APS, the corresponding APS may carry SCALING list data, and the SCALING list data may include scaling list data parameters for deriving a value of a frequency-based quantization scaling matrix/scaling factor/scaling list.

For example, as shown in Table 16 above, the aps_params_type syntax element may be parsed/signaled in APS, and in this case, when aps_params_type indicates a value of 0 (i.e., aps_params_type indicates ALF_APS) ALF data (i.e., alf_data( )) can be parsed/signaled. Alternatively, when aps_params_type has a value of 1 (i.e., aps_params_type indicates LMCS_APS), LMCS data (i.e., lmcs_data( )) may be parsed/signaled. Alternatively, when aps_params_type has a value of 2 (i.e., aps_params_type indicates SCALING_APS), scaling list data (i.e., scaling_list_data( )) may be parsed/signaled.

In addition, referring to Tables 16 and 17, aps_extension_flag syntax element may be parsed/signaled in the APS. aps_extension_flag may indicate whether APS extension data flag (aps_extension_data_flag) syntax elements are present. aps_extension_flag may be used, for example, to provide extension points for a later version of the VVC standard. The aps_extension_flag syntax element may be called an APS extension flag. For example, when the value of aps_extension_flag is 0, it may indicate that the APS extension data flag (aps_extension_data_flag) does not exist in an APS RBSP syntax structure. Alternatively, when the value of aps_extension_flag is 1, it may indicate that the APS extension data flag (aps_extension_data_flag) is present in the APS RBSP syntax structure.

The aps_extension_data_flag syntax element may be parsed/signaled based on the aps_extension_flag syntax element. The aps_extension_data_flag syntax element may be called an APS extension data flag. For example, when the value of aps_extension_flag is 1, aps_extension_data_flag may be parsed/signaled, and in this case, aps_extension_data_flag may have an arbitrary value.

As described above, according to an embodiment of this document, efficient scaling list data can be carried by allocating a data type (e.g., SCALING_APS) for indicating the scaling list data and parsing/signaling a syntax element (e.g., aps_params_type) indicating the data type. That is, according to an embodiment of this document, the structure of the APS in which the scaling list data is integrated may be used.

On the other hand, in the current VVC standard, the use of the scaling list data (i.e., scaling_list_data( )) may be indicated based on whether a flag (i.e., sps_scaling_list_enabled_flag) indicating whether or not the scaling list data is available in SPS (Sequence Parameter Set) exists. If the flag (i.e., sps_scaling_list_enabled_flag) is enabled (i.e., 1 or true as a case indicating that scaling list data is available), another flag (i.e., sps_scaling_list_data_present_flag) may be parsed. Also, when sps_scaling_list_data_present_flag is enabled (i.e., when it indicates that scaling list data exists in the SPS, and is 1 or true), the scaling list data (i.e., scaling_list_data( )) may be parsed. That is, in the current VVC standard, the SPS signals the scaling list data. In this case, since the SPS enables session negotiation and is generally transmitted out of band, it may be unnecessary to transmit the scaling list data as information which is related to the determination of the scaling factor of the transform block and can be used during the decoding process. If the encoder transmits the scaling list data in the SPS, the decoder needs to reserve a significant amount of memory to store the information obtained from the scaling list data and also needs to retain the information until it is used in transform block decoding. Therefore, this process may be unnecessary at the SPS level, and it may be more effective to be parsed/signaled at the lower level. Accordingly, this document proposes a hierarchical structure to effectively parse/signal the scaling list data.

In one embodiment, the scaling list data is not parsed/signaled from the higher-level syntax SPS, but parsed/signaled from the lower-level syntax PPS, tile group header, slice header, and/or other appropriate headers.

For example, the SPS syntax may be modified as shown in Table 19 below. Table 19 below shows an example of SPS syntax for describing a scaling list for CVS.

TABLE 19

| seq_parameter_set_rbsp( ) { | Descriptor |
|---|---|
| . . . | |
| scaling_list_enabled_flag | u(1) |
| ~~if( scaling_list_enabled_flag ) {~~ | |
| ~~**sps_scaling_list_data_present_flag**~~ | ~~u(1)~~ |
| ~~if( sps_scaling_list_data_present_flag )~~ | |
| ~~scaling_list_data( )~~ | |
| ~~}~~ | |
| . . . | |
| } | |

The semantics of the syntax elements included in the SPS syntax of Table 19 may be shown in Table 20 below.

TABLE 20

| |
|---|
| scaling_list_enabled_flag equal to 1 specifies that a scaling list is used for the scaling process for transform coefficients. scaling_list_enabled_flag equal to 0 specifies that scaling list is not used for the scaling process for transform coefficients. |

Referring to Tables 19 and 20, scaling_list_enabled_flag syntax element may be parsed/signaled in the SPS. The scaling_list_enabled_flag syntax element may indicate whether the scaling list is available based on whether the value is 0 or 1. For example, when the value of scaling_list_enabled_flag is 1, it indicates that the scaling list is used in the scaling process for the transform coefficient, and when the value of scaling_list_enabled_flag is 0, it may indicate that the scaling list is not used in the scaling process for the transform coefficient.

That is, the scaling_list_enabled_flag syntax element may be called a scaling list available flag, and may be signaled at SPS (or SPS level). In other words, based on the value of scaling_list_enabled_flag signaled at the SPS level, it may be determined that the scaling list is basically available for pictures in the CVS referring to the corresponding SPS. In addition, the scaling list may be obtained by signaling an additional available flag at a lower level than the SPS (e.g., PPS, tile group header, slice header, and/or other appropriate header).

As described above, according to an embodiment of this document, the scaling list (scaling_list_data( )) is not directly signaled at the SPS level, and only the scaling list available flag (scaling_list_enabled_flag) may be configured to be explicitly signaled. Thereafter, the scaling list (scaling_list_data( )) may be individually parsed in the lower-level syntax based on the available flag (scaling_list_enabled_flag) in the SPS. Therefore, according to an embodiment of this document, since the scaling list data can be parsed/signaled according to a hierarchical structure, coding efficiency can be further improved.

On the other hand, the existence or non-existence of the scaling list data and the use of the scaling list data are conditional on the existence of a tool enabling flag. Here, the tool enabling flag may be information indicating whether to enable the corresponding tool, and may include, for example, scaling_list_enabled_flag syntax element. That is, the scaling_list_enabled_flag syntax element may be used to indicate whether to enable the scaling list by indicating whether the scaling list data is available. However, this tool should have syntactic constraints on the decoder. That is, there must be a constraint flag to inform the decoder that this tool is not currently being used for decoding coded video sequences (CVS). Accordingly, this document proposes a method in which a constraint flag for scaling list data is applied.

As an embodiment, the following Table 21 shows an example of a syntax (e.g., general constraint information syntax) for signaling scaling list data using a constraint flag

TABLE 21

| general_constraint_info( ) { | Descriptor |
|---|---|
| . . . | |
| no_scaling_list_constraint_flag | u(1) |
| . . . | |
| } | |

Semantics of syntax elements included in the syntax of Table 21 may be shown in Table 22 below.

TABLE 22

| |
|---|
| no_scaling_list_constraint_flag equal to 1 specifies that it is a requirement of bitstream conformacne that scaling_list_enabled_flag shall be equal to 0. no_scaling_list_constraint_flag equal to 0 does not impose a constraint. |

Referring to Tables 21 and 22, the constraint flag may be parsed/signaled through general_constraint_info( ). general_constraint_info( ) may be referred to as information about a general constraint information field or constraint flags. For example, no_scaling_list_constraint_flag syntax element may be used as the constraint flag. Here, the constraint flag may be used to designate conformance bitstream properties. For example, when the value of the no_scaling_list_constraint_flag syntax element is 1, scaling_list_enabled_flag indicates a bitstream conformacne requirement that must be specified as 0, and when the value of the no_scaling_list_constraint_flag syntax element is 0, it may indicate that there is no restriction.

Meanwhile, as described above, according to the embodiment of this document, the scaling list data may be delivered through a hierarchical structure. Accordingly, this document proposes a structure of scaling list data that can be parsed/signaled through a slice header. Here, the slice header may be referred to as a tile group header, or may be mixed or replaced with a picture header.

As an embodiment, the following Table 23 shows an example of a slice header syntax for signaling scaling list data.

TABLE 23

| slice_header( ) { | Descriptor |
|---|---|
| slice_pic_parameter_set_id | ue(v) |
| . . . | |
| if( scaling_list_enabled_flag ) { | |
| slice_scaling_list_enabled_flag | u(1) |
| if( slice_scaling_list_enabled_flag ) | |
| slice_scaling_list_aps_id | u(5) |
| } | |
| . . . | |
| byte_alignment( ) | |
| } | |

The semantics of syntax elements included in the slice header syntax of Table 23 may be expressed as Table 24 below.

TABLE 24

| |
|---|
| When present, the value of each of the slice header syntax elements slice_pic_parameter_set_id, slice_pic_order_cnt_lsb, and slice_temporal_mvp_enabled_flag shall be the same in all slice headers of a coded picture. |
| slice_pic_parameter_set_id specifies the value of pps_pic_parameter_set_id for the PPS in use. The value of slice_pic_parameter_set_id shall be in the range of 0 to 63, inclusive. |
| slice_scaling_list_enabled_flag equal to 1 specifies that scaling list is enabled for the current slice. slice_scaling_list_enabled_flag equal to 0 specifies that scaling list is not enabled for the current slice. When slice_scaling_list_enabled_flag is not present, it is inferred to be equal to 0. |
| slice_scaling_list_aps_id specifies the adaptation_parameter_set_id of the SCALING DATA APS that the slice refers to. The TemporalId of the SCALING DATA APS NAL unit having adaptation_parameter_set_id equal to slice_scaling_list_aps_id shall be less than or equal to the TemporalId of the coded slice NAL unit. |
| When multiple SCALING DATA APSs with the same value of adaptation_parameter_set_id are referred to by two or more slices of the same picture, the multiple SCALING DATA APSs with the same value of adaptation_parameter_set_id shall have the same content. |

Referring to Tables 23 and 24, slice_pic_parameter_set_id syntax element may be parsed/signaled in the slice header. The slice_pic_parameter_set_id syntax element may indicate an identifier for a PPS in use. That is, the slice_pic_parameter_set_id syntax element is information for identifying a PPS referenced in a corresponding slice, and may indicate a value of pps_pic_parameter_set_id. The value of slice_pic_parameter_set_id must be in the range of 0 to 63. The slice_pic_parameter_set_id syntax element may be referred to as PPS identification information or PPS ID information referenced by a slice.

In addition, the slice_scaling_list_enabled_flag syntax element may be parsed/signaled in the slice header. The slice_scaling_list_enabled_flag syntax element may indicate whether a scaling list is available in the current slice. For example, when the value of slice_scaling_list_enabled_flag is 1, it may indicate that the scaling list is available in the current slice, and when the value of slice_scaling_list_enabled_flag is 0, it may indicate that the scaling list is not available in the current slice. Alternatively, if slice_scaling_list_enabled_flag does not exist in the slice header, its value may be inferred to be 0.

In this case, whether to parse the slice_scaling_list_enabled_flag syntax element may be determined based on the scaling_list_enabled_flag syntax element signaled in the higher-level syntax (i.e., SPS). For example, when the value of scaling_list_enabled_flag signaled from SPS is 1 (that is, when it is determined that scaling list data is available at a higher level), slice_scaling_list_enabled_flag is parsed from the slice header, and whether to perform a scaling process may be determined using a scaling list in a corresponding slice.

In addition, the slice_scaling_list_aps_id syntax element may be parsed/signaled in the slice header. The slice_scaling_list_aps_id syntax element may indicate an identifier for an APS referenced in a corresponding slice. That is, the slice_scaling_list_aps_id syntax element may indicate ID information of the APS (adaptation_parameter_set_id) including the scaling list data referenced by the corresponding slice. On the other hand, the TemporalId (i.e., Temporal ID) of the APS NAL unit (i.e., the APS NAL unit including the scaling list data) having the same APS ID information (adaptation_parameter_set_id) as slice_scaling_list_aps_id must be less than or equal to TemporalId (i.e., Temporal ID) of the slice NAL unit to be coded.

In addition, whether to parse the slice_scaling_list_aps_id syntax element may be determined based on the slice_scaling_list_enabled_flag syntax element. For example, when the value of slice_scaling_list_aps_id is 1 (i.e., when the scaling list is determined to be available in the slice header), slice_scaling_list_aps_id may be parsed. Thereafter, the scaling list data may be obtained from the APS indicated by the parsed slice_scaling_list_aps_id.

In addition, when a plurality of SCALING DATA APSs (a plurality of APSs including scaling list data) having the APS ID information (adaptation_parameter_set_id) of the same value are referenced by two or more slices in the same picture, a plurality of SCALING DATA APSs having the APS ID information of the same value (adaptation_parameter_set_id) must include the same content.

In addition, when the above-mentioned syntax elements are present, the values of each of the slice header syntax elements slice_pic_parameter_set_id, slice_pic_order_cnt_lsb, and slice_temporal_mvp_enabled_flag must be the same in all slice headers in the coded picture.

As described above, according to an embodiment of this document, a hierarchical structure may be used to efficiently signal the scaling list data. That is, it is possible to determine whether to use the scaling list data at each lower level by first signaling an enable flag (e.g., scaling_list_enabled_flag) indicating whether or not scaling list data is available at a higher level (SPS syntax), and then signaling an additional available flag (e.g., slice_scaling_list_enabled_flag) at a lower level (e.g., slice header, picture header, etc.). In addition, APS ID information (e.g., slice_scaling_list_aps_id) referred to by the corresponding slice or tile group is signaled through the lower level (e.g., slice header, picture header, etc.), and the scaling list data may be derived from the APS identified by the APS ID information.

In addition, this document may be applied such as the methods proposed in Tables 23 and 24 above in signaling the scaling list data according to the hierarchical structure, and the scaling list data may be delivered through the structure of the slice header as shown in Table 25 below.

As an embodiment, the following Table 25 shows an example of a slice header syntax for signaling the scaling list data. Here, the slice header may be referred to as a tile group header, or may be mixed or replaced with a picture header.

TABLE 25

| slice_header( ) { | Descriptor |
|---|---|
| slice_pic_parameter_set_id | ue(v) |
| . . . | |
| if( scaling_list_enabled_flag ) { | |
| slice_scaling_list_aps_id | u(5) |
| } | |
| . . . | |

TABLE 25-continued

| slice_header( ) { | Descriptor |
|---|---|
| byte_alignment( ) | |
| } | |

The semantics of syntax elements included in the slice header syntax of Table 25 may be shown in Table 26 below.

TABLE 26

| |
|---|
| When present, the value of each of the slice header syntax elements slice_pic_parameter_set_id, slice_pic_order_cnt_lsb, and slice_temporal_mvp_enabled_flag shall be the same in all slice headers of a coded picture. |
| slice_pic_parameter_set_id specifies the value of pps_pic_parameter_set_id for the PPS in use. The value of slice_pic_parameter_set_id shall be in the range of 0 to 63, inclusive. |
| slice_scaling_list_aps_id specifies the adaptation_parameter_set_id of the SCALING DATA APS that the slice refers to. The TemporalId of the SCALING LIST APS NAL unit having adaptation_parameter_set_id equal to slice_scaling_list_aps_id shall be less than or equal to the TemporalId of the coded slice NAL unit. |
| When multiple SCALING LIST APSs with the same value of adaptation_parameter_set_id are referred to by two or more slices of the same picture, the multiple SCALING LIST APSs with the same value of adaptation_parameter_set_id shall have the same content. |

Referring to Tables 25 and 26 above, the slice_pic_parameter_set_id syntax element may be parsed/signaled in the slice header. The slice_pic_parameter_set_id syntax element may indicate an identifier for a PPS in use. That is, the slice_pic_parameter_set_id syntax element is information for identifying a PPS referenced in a corresponding slice, and may indicate a value of pps_pic_parameter_set_id. The value of slice_pic_parameter_set_id must be in the range of 0 to 63. The slice_pic_parameter_set_id syntax element may be referred to as PPS identification information or PPS ID information referenced by a slice.

In addition, the slice_scaling_list_aps_id syntax element may be parsed/signaled in the slice header. The slice_scaling_list_aps_id syntax element may indicate an identifier for an APS referenced in a corresponding slice. That is, the slice_scaling_list_aps_id syntax element may indicate ID information (adaptation_parameter_set_id) of the APS including the scaling list data referenced by the corresponding slice. For example, the TemporalId (i.e., Temporal ID) of the APS NAL unit (i.e., the APS NAL unit including the scaling list data) having the same APS ID information (adaptation_parameter_set_id) as the slice_scaling_list_aps_id must be less than or equal to TemporalId (i.e., Temporal ID) of the slice NAL unit to be coded.

In this case, whether to parse the slice_scaling_list_aps_id syntax element may be determined based on the scaling_list_enabled_flag syntax element signaled in the higher-level syntax (i.e., SPS). For example, when the value of scaling_list_enabled_flag signaled by SPS is 1 (that is, when it is determined that scaling list data is available at a higher level), slice_scaling_list_aps_id may be parsed from the slice header. Thereafter, the scaling list data can be obtained from the APS indicated by the parsed slice_scaling_list_aps_id.

That is, according to the present embodiment, since the APS ID including the scaling list data can be parsed when the corresponding flag (e.g., scaling_list_enabled_flag) in the SPS is enabled, as shown in Table 25 above, based on the scaling_list_enabled_flag syntax element signaled in the higher level syntax (i.e., SPS), the APS ID (e.g., slice_scaling_list_aps_id) information including the scaling list data to be referenced in the lower level (e.g., slice header or picture header) can be parsed.

In addition, this document proposes a method of using a plurality of APSs to signal the scaling list data. Hereinafter, a method of efficiently signaling a plurality of APS IDs including the scaling list data according to an embodiment of the present document will be described. This method can be useful during bitstream merging.

As an embodiment, the following Table 27 shows an example of a slice header syntax for signaling scaling list data using a plurality of APSs. Here, the slice header may be referred to as a tile group header, or may be mixed or replaced with a picture header.

TABLE 27

| slice_header( ) { | Descriptor |
|---|---|
| slice_pic_parameter_set_id | ue(v) |
| if(scaling_list_enabled_flag) { | |
| slice_scaling_list_enabled_flag | u(1) |
| if( slice_scaling_list_enabled_flag ) { | |
| num_scaling_list_aps_ids_minus1 | ue(v) |
| for( i = 0; i <= num_scaling_list_aps_ids_minus1; i++ ) | |
| slice_scaling_list_aps_id[ i ] | u(5) |
| } | |
| } | |
| . . . | |
| byte_alignment( ) | |
| } | |

The semantics of syntax elements included in the slice header syntax of Table 27 can be expressed as shown in Table 28 below.

TABLE 28

| |
|---|
| slice_scaling_list_enabled_flag equal to 1 specifies that scaling list is enabled for the current slice. slice_scaling_list_enabled_flag equal to 0 specifies that scaling list is not enabled for the current slice. When slice_scaling_list_enabled_flag is not present, it isinferred to be equal to 0. |
| num_scaling_list_aps_ids_minus1 plus 1 specifies the number of SCALING LIST APSs that the slice refers to. The value of num_scaling_list_aps_ids minus1 shall be in the range of 0 to 7, inclusive |
| slice_scaling_list_aps_id[ i ] specifies the adaptation_parameter_set_id of the i-th SCALING LIST APS that the slice refers to. The TemporalId of the SCALING LIST APS NAL unit having adaptation_parameter_set_id equal to slice_scaling_list_aps_id[ i ] shall be less than or equal to the TemporalId of the coded slice NAL unit. |
| When multiple SCALING LIST APSs with the same value of adaptation_parameter_set_id are referred to by two or more slices of the same picture, the multiple SCALING LIST APSs with the same value of adaptation_parameter_set_id shall have the same content. |

Referring to Tables 27 and 28 above, slice_pic_parameter_set_id syntax element may be parsed/signaled in the slice header. The slice_pic_parameter_set_id syntax element may indicate an identifier for the PPS being used in the slice_pic_parameter_set_id syntax element. That is, the slice_pic_parameter_set_id syntax element is information for identifying a PPS referenced in a corresponding slice, and may indicate a value of pps_pic_parameter_set_id. The value of slice_pic_parameter_set_id must be in the range of 0 to 63. The slice_pic_parameter_set_id syntax element may be referred to as PPS identification information or PPS ID information referenced by a slice.

In addition, the slice_scaling_list_enabled_flag syntax element may be parsed/signaled in the slice header. The slice_scaling_list_enabled_flag syntax element may indicate whether a scaling list is available in the current slice. For example, when the value of slice_scaling_list_enabled_flag is 1, it may indicate that the scaling list is available in the current slice, and when the value of slice_scaling_list_enabled_flag is 0, it may indicate that the scaling list is not available in the current slice. Alternatively, when slice_scaling_list_enabled_flag does not exist in the slice header, its value may be inferred to be 0.

In this case, whether to parse the slice_scaling_list_enabled_flag syntax element may be determined based on the scaling_list_enabled_flag syntax element signaled in the higher-level syntax (i.e., SPS). For example, when the value of scaling_list_enabled_flag signaled from SPS is 1 (that is, when it is determined that scaling list data is available at a higher level), slice_scaling_list_enabled_flag is parsed from the slice header, and whether to perform a scaling process may be determined using a scaling list in a corresponding slice.

In addition, the num_scaling_list_aps_ids_minus1 syntax element may be parsed/signaled in the slice header. The num_scaling_list_aps_ids_minus1 syntax element may be information for indicating the number of APSs including scaling list data referenced by a corresponding slice. For example, a value obtained by adding 1 to the value of the num_scaling_list_aps_ids_minus1 syntax element may be the number of APSs. The value of num_scaling_list_aps_ids_minus1 must be in the range of 0 to 7.

Here, whether to parse the num_scaling_list_aps_ids_minus1 syntax element may be determined based on the slice_scaling_list_enabled_flag syntax element. For example, when the value of slice_scaling_list_enabled_flag is 1 (i.e., when it is determined that scaling list data is available in the corresponding slice), num_scaling_list_aps_ids_minus1 may be parsed. In this case, the slice_scaling_list_aps_id[i] syntax element may be parsed/signaled based on the value of num_scaling_list_aps_ids_minus1.

That is, slice_scaling_list_aps_id[i] may indicate an identifier (adaptation_parameter_set_id) of an APS including i-th scaling list data (i.e., i-th SCALING LIST APS). In other words, the APS ID information may be signaled as many as the number of APSs indicated by the num_scaling_list_aps_ids_minus1 syntax element. On the other hand, the TemporalId (i.e., Temporal ID) of the APS NAL unit (i.e., the APS NAL unit including the scaling list data) having the same APS ID information (adaptation_parameter_set_id) as slice_scaling_list_aps_id[i] must be less than or equal to TemporalId (i.e., Temporal ID) of the slice NAL unit to be coded.

In addition, when a plurality of SCALING DATA APSs (a plurality of APSs including scaling list data) having the APS ID information (adaptation_parameter_set_id) of the same value are referenced by two or more slices in the same picture, a plurality of SCALING DATA APSs having the APS ID information of the same value (adaptation_parameter_set_id) must include the same content.

The following drawings were created to explain a specific example of this document. The names of specific devices or specific terms or names (e.g., names of syntax/syntax elements, etc.) described in the drawings are provided by way of example, so that the technical features of this document are not limited to the specific names used in the drawings below.

Figure 7:
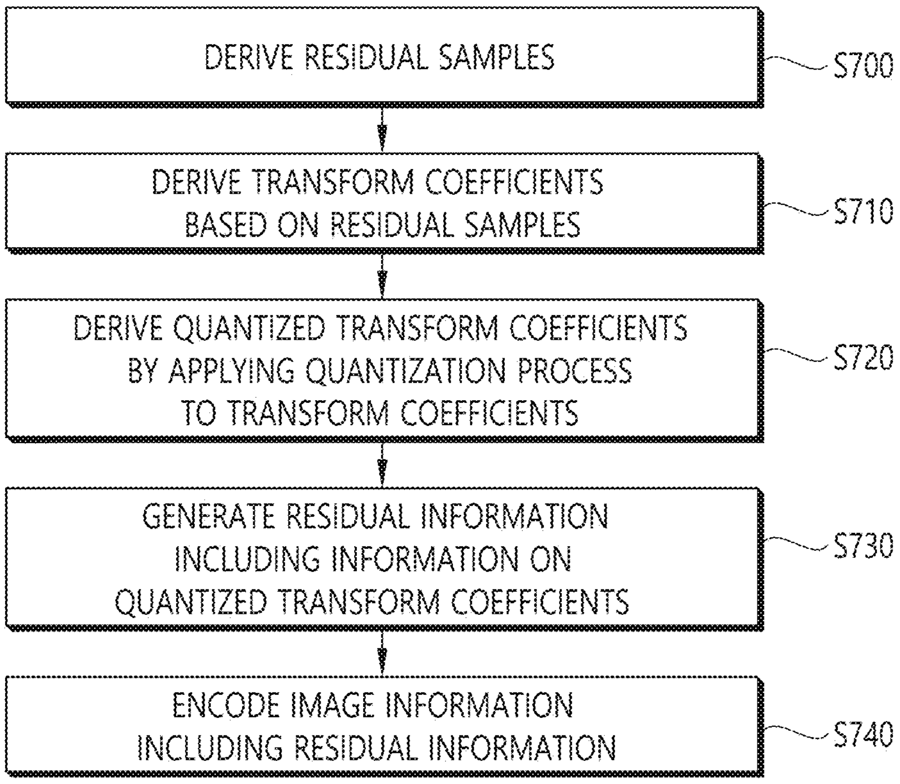
FIG. 7 is a flowchart schematically illustrating an example of a video/image encoding method according to embodiment(s) of this document.

FIG. 7 is a flowchart schematically illustrating an example of a video/image encoding method according to embodiment(s) of this document.

The method disclosed in FIG. 7 may be performed by the encoding apparatus 200 illustrated in FIG. 2. Specifically, step S700 of FIG. 7 may be performed by the substracor 231 illustrated in FIG. 2, and step S710 of FIG. 7 may be performed by the transformer 232 illustrated in FIG. 2, steps S720 and S730 of FIG. 7 may be performed by the quantizer 233 illustrated in FIG. 2, and step S740 of FIG. 7 may be performed by the entropy encoder 240 illustrated in FIG. 2 Also, the method disclosed in FIG. 7 may be performed including the embodiments described above in this document. Accordingly, in FIG. 7, a detailed description of content overlapping with the above-described embodiments will be omitted or simplified.

Referring to FIG. 7, the encoding apparatus may derive residual samples for a current block (S700).

As an embodiment, first, the encoding apparatus may determine a prediction mode for the current block and derive prediction samples. For example, the encoding apparatus may determine whether to perform the inter prediction or the intra prediction on the current block, and may also determine a specific inter prediction mode or a specific intra prediction mode based on the RD cost. The encoding apparatus may derive the prediction samples for the current block by performing prediction according to the determined prediction mode. In this case, various prediction methods disclosed in this document, such as inter prediction or intra prediction, may be applied. Also, the encoding apparatus may generate and encode information related to prediction applied to the current block (e.g., prediction mode information).

And, the encoding apparatus may derive residual samples by comparing original samples and prediction samples for the current block.

The encoding apparatus may generate transform coefficients based on the residual samples (S710).

In an embodiment, the encoding apparatus may derive transform coefficients through a transform process on the residual samples. In this case, the encoding apparatus may determine whether to apply the transform to the current block in consideration of coding efficiency. That is, the encoding apparatus may determine whether a transform is applied to the residual samples. For example, when no transform is applied to the residual samples, the encoding apparatus may derive the residual samples as transform coefficients. Alternatively, when transform is applied to the residual samples, the encoding apparatus may derive transform coefficients by performing transform on the residual samples. In this case, the encoding apparatus may generate and encode transform skip flag information based on whether transform is applied to the current block. The transform skip flag information may be information indicating whether the transform is applied or the transform is skipped with respect to the current block.

The encoding apparatus may derive quantized transform coefficients based on the transform coefficients (S720).

As an embodiment, the encoding apparatus may derive quantized transform coefficients by applying a quantization process on the transform coefficients. In this case, the encoding apparatus may apply frequency weighting quantization that adjusts the quantization intensity according to the frequency. In this case, the quantization process may be further performed based on a quantization scale value for each frequency. The quantization scale value for the frequency weighting quantization may be derived using a scaling matrix. For example, the encoding apparatus/decoding apparatus may use a predefined scaling matrix, and the encoding apparatus may configure and encode frequency quantization scale information with respect to the scaling matrix, and may signal this to the decoding apparatus. The frequency quantization scale information may include scaling list data. A (modified) scaling matrix may be derived based on the scaling list data.

Also, the encoding apparatus may perform the dequantization process in the same manner as in the decoding apparatus. In this case, the encoding apparatus may derive the (modified) scaling matrix based on the scaling list data, and may derive reconstructed transform coefficients by applying the dequantization to the quantized transform coefficients based thereon. In this case, the reconstructed transform coefficients may be different from the original transform coefficients due to a loss in the transform/quantization process.

Here, the scaling matrix may refer to the above-described frequency-based quantization scaling matrix, and may be used interchangeably or replaced with a quantization scaling matrix, a quantization matrix, a scaling matrix, a scaling list, etc. for convenience of description, and it is not limited to the specific name used in this embodiment.

That is, the encoding apparatus may further apply the frequency weighting quantization in performing the quantization process, and in this case, may generate scaling list data as information on the scaling matrix. Since this process has been described in detail with reference to Table 5 to Table 15 as an example, redundant content or detailed description will be omitted in this embodiment.

The encoding apparatus may generate residual information including information on the quantized transform coefficients (S730).

Here, the residual information may include information on the value of the quantized transform coefficients, location information, a transform technique, a transform kernel, a quantization parameter, etc.

The encoding apparatus may encode image information (or video information) (S740). Here, the image information may include the residual information. Also, the image information may include the prediction-related information (e.g., prediction mode information). Also, the image information may include the information on the scaling list data. That is, the image information may include various information derived from an encoding process, and may be encoded by including such various information.

As an embodiment, the image information may include various information according to the embodiment(s) described above in this document, and may include information disclosed in at least one of Tables 1 to 28 described above.

For example, the image information may include an adaptation parameter set (APS). The APS may include APS identification information (APS ID information) and type information of APS parameters. Also, the APS may include scaling list data based on the type information of the APS parameters. The scaling list data may include scaling list parameters for deriving a scaling list/scaling matrix/scale factor used in the quantization/dequantization process as described above. In other words, the scaling list data may include syntax elements used to construct the scaling list.

As an example, the APS may be configured as shown in Table 16 above. The APS identification information may be adaptation_parameter_set_id described in Tables 16 and 17 above. The type information of the APS parameters may be aps_params_type described in Tables 16 to 18 above. For example, when type information (e.g., aps_params_type) of APS parameters is a SCALING_APS type related to indicating that it is an APS including scaling list data (or when a value of type information (e.g., aps_params_type) of APS parameters is equal to 2), the APS may include scaling list data (e.g., scaling_list_data ( ). That is, the encoding apparatus may signal the scaling list data (e.g., scaling_list_data ( ) through the APS based on SCALING_APS type information indicating that it is an APS including the scaling list data.

Also, for example, the image information may include header information. The header information may be header information related to a picture or a slice including the current block, and may include, for example, a picture header or a slice header. The header information may include APS identification information related to scaling list data. The APS identification information related to the scaling list data included in the header information may indicate identification information of the APS including the scaling list data. As an example, the APS identification information related to the scaling list data included the header information may be the slice_scaling_list_aps_id described in Tables 23 to 26 above, and may be identification information for an APS (including scaling list data) referenced by a slice/picture including the current block. That is, the APS including the scaling list data may be identified based on the APS identification information related to the scaling list data.

Also, for example, the image information may include a sequence parameter set (SPS). The SPS may include first available flag information related to indicating whether the scaling list data is available. As an example, the SPS may be configured as shown in Table 19, and the first available flag information may be scaling_list_enabled_flag described in Tables 19 and 20 above.

At this time, based on the first available flag information (e.g., scaling_list_enabled_flag) related to indicating that the scaling list data is available (e.g., when the value of the first available flag information (e.g., scaling_list_enabled_flag) is equal to 1 or true), the header information may include APS identification information related to the scaling list data ((e.g., slice_scaling_list_aps_id). As an example, the encoding apparatus may signal identification information (e.g., slice_scaling_list_aps_id) of the APS including the scaling list data through the header information based on the first available flag information (e.g., scaling_list_enabled_flag) as shown in Tables 23 and 25 above.

The header information may include second available flag information related to indicating whether the scaling list data is available in the picture or the slice. As an example, the second available flag information may be slice_scaling_list_enabled_flag described in Tables 23 and 24 above.

At this time, based on the first available flag information (e.g., scaling_list_enabled_flag) related to indicating that the scaling list data is available (e.g., when the value of the first available flag information (e.g., scaling_list_enabled_flag) is equal to 1 or true), the header information may include second available flag information (e.g., slice_scaling_list_enabled_flag). And, based on the second available flag information (e.g., slice_scaling_list_enabled_flag) (e.g., when the value of the second available flag information (e.g., slice_scaling_list_enabled_flag) is equal to 1 or true), the header information may include APS identification information related to the scaling list data (e.g., slice_scaling_list_aps_id). As an example, the encoding apparatus may signal the second available flag information (e.g., slice_scaling_list_enabled_flag) through header information based on the first available flag information (e.g., scaling_list_enabled_flag) signaled from the SPS as shown in Table 23 above, and then may signal the APS identification information related to the scaling list data (e.g., slice_scaling_list_aps_id) through the header information based on the second available flag information (e.g., slice_scaling_list_enabled_flag).

Also, for example, the image information may include constraint flag information regarding the use of the first available flag information. As an example, the constraint flag information may be no_scaling_list_constraint_flag described in Tables 21 and 22 above. The constraint flag information (e.g., no_scaling_list_constraint_flag) may be signaled by being included in general constraint information syntax (e.g., general_constraint_info( )). For example, when the value of constraint flag information (e.g., no_scaling_list_constraint_flag) is equal to 1, it is restricted through general constraint information syntax (e.g., general_constraint_info( )) so that the value of the first available flag information (e.g., scaling_list_enabled_flag) is set to 0. Alternatively, when the value of the constraint flag information (e.g., no_scaling_list_constraint_flag) is equal to 0, it may indicate that there is no constraint on the first available flag information (e.g., scaling_list_enabled_flag).

Also, for example, the image information may include header information related to a picture or a slice including the current block. For example, the header information and may include a picture header or a slice header. The header information may include APS number information indicating the number of APS identification information related to the scaling list data. In this case, the header information may include APS identification information related to the scaling list data as many as the number of the APS identification information derived based on the APS number information.

As an example, the APS number information may be num_scaling_list_aps_ids_minus1 described in Tables 27 and 28 above. As described in Table 27, the value obtained by adding 1 to the value of num_scaling_list_aps_ids_minus1 may be the number of the APS identification information. Accordingly, as many slice_scaling_list_aps_ids as the number of the APS identification information (the value of num_scaling_list_aps_ids_minus1 plus 1) may be included in the header information.

The image information including various information as described above may be encoded and output in the form of the bitstream. The bitstream may be transmitted to the decoding apparatus via a network or (digital) storage medium. Here, the network may include a broadcasting network and/or a communication network, and the digital storage medium may include various storage media such as USB, SD, CD, DVD, Blu-ray, HDD, and SSD.

Figure 8:
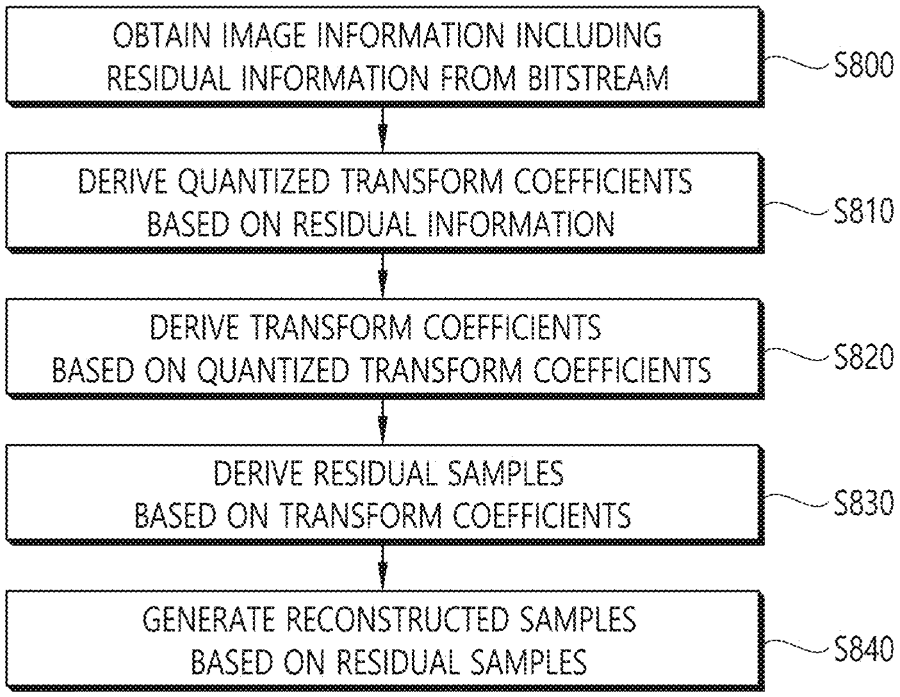
FIG. 8 is a flowchart schematically illustrating an example of a video/image decoding method according to embodiment(s) of this document.

FIG. 8 is a flowchart schematically illustrating an example of a video/image decoding method according to embodiment(s) of this document.

The method disclosed in FIG. 8 may be performed by the decoding apparatus 300 illustrated in FIG. 3. Specifically, steps S800 and S810 of FIG. 8 may be performed by the the entropy decoder 310 illustrated in FIG. 3, step S820 of FIG. 8 may be performed by the dequantizer 321 illustrated in FIG. 3, step S830 of FIG. 8 may be performed by the inverse transformer 322 illustrated in FIG. 3, and step S840 of FIG. 8 may be performed by the adder 340 illustrated in FIG. 3. Also, the method disclosed in FIG. 8 may be performed including the embodiments described above in this document. In addition, the method disclosed in FIG. 8 may be performed including the embodiments described above in this document. Accordingly, in FIG. 8, a detailed description of the content overlapping with the above-described embodiments will be omitted or simplified.

Referring to FIG. 8, the decoding apparatus may receive image information (or video information) from a bitstream (S800).

As an embodiment, the decoding apparatus may derive information (e.g., video/image information) necessary for image reconstruction (or picture reconstruction) by parsing the bitstream. In this case, the image information may include residual information, and the residual information may include information such as information on the value of quantized transform coefficients, location information, a transform technique, a transform kernel, and a quantization parameter. Also, the image information may include information related to prediction (e.g., prediction mode information). Also, the image information may include information on scaling list data. That is, the image information may include various information required in the decoding process, and may be decoded based on a coding method such as exponential Golomb coding, CAVLC, or CABAC.

As an embodiment, the image information may include various information according to the embodiment(s) described above in this document, and may include information disclosed in at least one of Tables 1 to 28 described above.

For example, the image information may include an adaptation parameter set (APS). The APS may include APS identification information and type information of APS parameters. Also, the APS may include scaling list data based on the type information of the APS parameters. The scaling list data may include scaling list parameters for deriving a scaling list/scaling matrix/scale factor used in the quantization/dequantization process as described above. In other words, the scaling list data may include syntax elements used to construct the scaling list.

As an example, the APS may be configured as shown in Table 16 above. The APS identification information may be adaptation_parameter_set_id described in Tables 16 and 17 above. The type information of the APS parameters may be aps_params_type described in Tables 16 to 18 above. For example, when type information (e.g., aps_params_type) of APS parameters is a SCALING_APS type related to indicating that it is an APS including scaling list data (or when a value of type information (e.g., aps_params_type) of APS parameters is equal to 2), the APS may include scaling list data (e.g., scaling_list_data( )). That is, the decoding apparatus may obtain and parse the scaling list data (e.g., scaling_list_data( )) through the APS based on SCALING_APS type information indicating that it is an APS including the scaling list data.

Also, for example, the image information may include header information. The header information may be header information related to a picture or a slice including the current block, and may include, for example, a picture header or a slice header. Also, the header information may include APS identification information related to scaling list data. The APS identification information related to the scaling list data included in the header information may indicate identification information of the APS including the scaling list data. As an example, the APS identification information related to the scaling list data included the header information may be the slice_scaling_list_aps_id described in Tables 23 to 26 above, and may be identification information for an APS (including scaling list data) referenced by a slice/picture including the current block. That is, the decoding apparatus may identify the APS based on the APS identification information (e.g., slice_scaling_list_aps_id) in the header information and may obtain the scaling list data form the APS.

Also, for example, the image information may include a sequence parameter set (SPS). The SPS may include first available flag information related to indicating whether the scaling list data is available. As an example, the SPS may be configured as shown in Table 19, and the first available flag information may be scaling_list_enabled_flag described in Tables 19 and 20 above.

At this time, based on the first available flag information (e.g., scaling_list_enabled_flag) related to indicating that the scaling list data is available (e.g., when the value of the first available flag information (e.g., scaling_list_enabled_flag) is equal to 1 or true), the header information may include APS identification information related to the scaling list data (e.g., slice_scaling_list_aps_id). As an example, the decoding apparatus may obtain identification information (e.g., slice_scaling_list_aps_id) of the APS including the scaling list data through the header information based on the first available flag information (e.g., scaling_list_enabled_flag) as shown in Tables 23 and 25 above.

Also, for example, the header information may include second available flag information related to indicating whether the scaling list data is available in the picture or the slice. As an example, the second available flag information may be slice_scaling_list_enabled_flag described in Tables 23 and 24 above.

At this time, based on the first available flag information (e.g., scaling_list_enabled_flag) related to indicating that the scaling list data is available (e.g., when the value of the first available flag information (e.g., scaling_list_enabled_flag) is equal to 1 or true), the header information may include second available flag information (e.g., slice_scaling_list_enabled_flag). And, based on the second available flag information (e.g., slice_scaling_list_enabled_flag) (e.g., when the value of the second available flag information (e.g., slice_scaling_list_enabled_flag) is equal to 1 or true), the header information may include APS identification information related to the scaling list data (e.g., slice_scaling_list_aps_id). As an example, the decoding apparatus may obtain the second available flag information (e.g., slice_scaling_list_enabled_flag) through header information based on the first available flag information (e.g., scaling_list_enabled_flag) signaled from the SPS as shown in Table 23 above, and then may obtain the APS identification information related to the scaling list data (e.g., slice_scaling_list_aps_id) through the header information based on the second available flag information (e.g., slice_scaling_list_enabled_flag).

Also, for example, the image information may include constraint flag information regarding the use of the first available flag information. As an example, the constraint flag information may be no_scaling_list_constraint_flag described in Tables 21 and 22 above. The constraint flag information (e.g., no_scaling_list_constraint_flag) may be signaled by being included in general constraint information syntax (e.g., general_constraint_info( )). For example, when the value of constraint flag information (e.g., no_scaling_list_constraint_flag) is equal to 1, it is restricted through general constraint information syntax (e.g., general_constraint_info( )) so that the value of the first available flag information (e.g., scaling_list_enabled_flag) is set to 0. Alternatively, when the value of the constraint flag information (e.g., no_scaling_list_constraint_flag) is equal to 0, it may indicate that there is no constraint on the first available flag information (e.g., scaling_list_enabled_flag).

Also, for example, the image information may include header information related to a picture or a slice including the current block. For example the header information and may include a picture header or a slice header. Also, the header information may include APS number information indicating the number of APS identification information related to the scaling list data. In this case, the header information may include APS identification information related to the scaling list data as many as the number of the APS identification information derived based on the APS number information.

As an example, the APS number information may be num_scaling_list_aps_ids_minus1 described in Tables 27 and 28 above. As described in Table 27, the value obtained by adding 1 to the value of num_scaling_list_aps_ids_minus1 may be the number of the APS identification information. Accordingly, as many slice_scaling_list_aps_ids as the number of the APS identification information (the value of num_scaling_list_aps_ids_minus1 plus 1) may be included in the header information.

The decoding apparatus may derive quantized transform coefficients for the current block (S810).

As an embodiment, the decoding apparatus may acquire residual information included in the image information. The residual information may include information such as information on the value of the quantized transform coefficients as described above, location information, a transform technique, a transform kernel, and a quantization parameter. The decoding apparatus may derive the quantized transform coefficients for the current block based on the quantized transform coefficient information included in the residual information.

The decoding apparatus may derive transform coefficients based on the quantized transform coefficients (S820).

As an example, the decoding apparatus may derive transform coefficients by applying a dequantization process on the quantized transform coefficients. In this case, the decoding apparatus may apply frequency weighting quantization that adjusts the quantization intensity according to the frequency. In this case, the dequantization process may be further performed based on a quantization scale value for each frequency. The quantization scale value for the frequency weighting quantization may be derived using a scaling matrix. For example, the decoding apparatus may use a predefined scaling matrix, or may use frequency quantization scale information with respect to the scaling matrix signaled from the encoding apparatus. The frequency quantization scale information may include scaling list data. A (modified) scaling matrix may be derived based on the scaling list data.

That is, the decoding apparatus may further apply the frequency weighting quantization in performing the dequantization process. In this case, the decoding apparatus may derive transform coefficients by applying the dequantization process on the quantized transform coefficients based on the scaling list data.

As an embodiment, the decoding apparatus may acquire the APS included in the image information, and may acquire the scaling list data based on type information of the APS parameters included in the APS. For example, the decoding apparatus may acquire the scaling list data included in the APS based on SCALING_APS type information related to indicating that it is an APS including the scaling list data. In this case, the decoding apparatus may derive a scaling matrix based on the scaling list data, may derive a scaling factor based on the scaling matrix, and may derive transform coefficients by applying the dequantization based on the scaling factor. Since the process of performing scaling based on the scaling list data has been described in detail with reference to Tables 5 to 15 as an example, redundant content or detailed description will be omitted in this embodiment.

Also, the decoding apparatus may determine whether to apply the frequency weighting quantization in the dequantization process (i.e., whether to derive transform coefficients using a (frequency-based quantization) scaling list in the dequantization process). For example, the decoding apparatus determines whether to use the scaling list data based on the first available flag obtained from the SPS included in the image information and/or the second available flag information obtained from the header information included in the image information. If it is determined to use the scaling list data based on the first available flag and/or the second available flag information, the decoding apparatus may identify a corresponding APS based on APS identification information related to the scaling list data included in the header information, and may obtain the scaling list data from the identified APS.

The decoding apparatus may derive residual samples based on the transform coefficients (S830).

As an embodiment, the decoding apparatus may derive residual samples of the current block by performing an inverse transform on transform coefficients of the current block. In this case, the decoding apparatus may obtain information indicating whether to apply inverse transform to the current block (i.e., transform skip flag information), and derive residual samples based on this information (i.e., transform skip flag information).

For example, when the inverse transform is not applied to the transform coefficients (when the value of the transform skip flag information for the current block is equal to 1), the decoding apparatus may derive the transform coefficients as residual samples of the current block. Alternatively, when inverse transform is applied to transform coefficients (when the value of transform skip flag information for the current block is equal to 0), the decoding apparatus may perform inverse transform on the transform coefficients to derive residual samples of the current block.

The decoding apparatus may generate reconstructed samples based on the residual samples (S840).

As an embodiment, the decoding apparatus may determine whether to perform an inter prediction or an intra prediction on the current block based on prediction information (e.g., the prediction mode information) included in image information, and derive prediction samples for the current block by performing the prediction according to the determination. And, the decoding apparatus may generate reconstructed samples based on the prediction samples and the residual samples. In this time, the decoding apparatus may directly use the prediction samples as reconstructed samples according to the prediction mode, or may generate reconstructed samples by adding residual samples to the prediction samples. Also, a reconstructed block or a reconstructed picture may be derived based on the reconstructed samples. Thereafter, as described above, the decoding apparatus may apply an in-loop filtering process such as deblocking filtering and/or SAO process to the reconstructed picture in order to improve subjective/objective picture quality, if necessary.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip. In this case, information for implementation (ex. information on instructions) or an algorithm may be stored in a digital storage medium.

Furthermore, the decoding apparatus and the encoding apparatus to which this document is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VOD) service provision device, an over the top (OTT) video device, an Internet streaming service provision device, a three-dimensional (3D) video device, a virtual reality (VR) device, an augmented reality (AR) device, a video telephony device, transportation means terminal (e.g., a vehicle (including autonomous vehicle) terminal, an aircraft terminal, and a vessel terminal), and a medical video device, and may be used to process a video signal or a data signal. For example, the over the top (OTT) video device may include a game console, a Blueray player, Internet access TV, a home theater system, a smartphone, a tablet PC, and a digital video recorder (DVR).

Furthermore, the processing method to which this document is applied may be produced in the form of a program executed by a computer, and may be stored in a computer-readable recording medium. Multimedia data having a data structure according to this document may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication network.

Furthermore, an embodiment of this document may be implemented as a computer program product using program code. The program code may be performed by a computer according to an embodiment of this document. The program code may be stored on a carrier readable by a computer.

Figure 9:
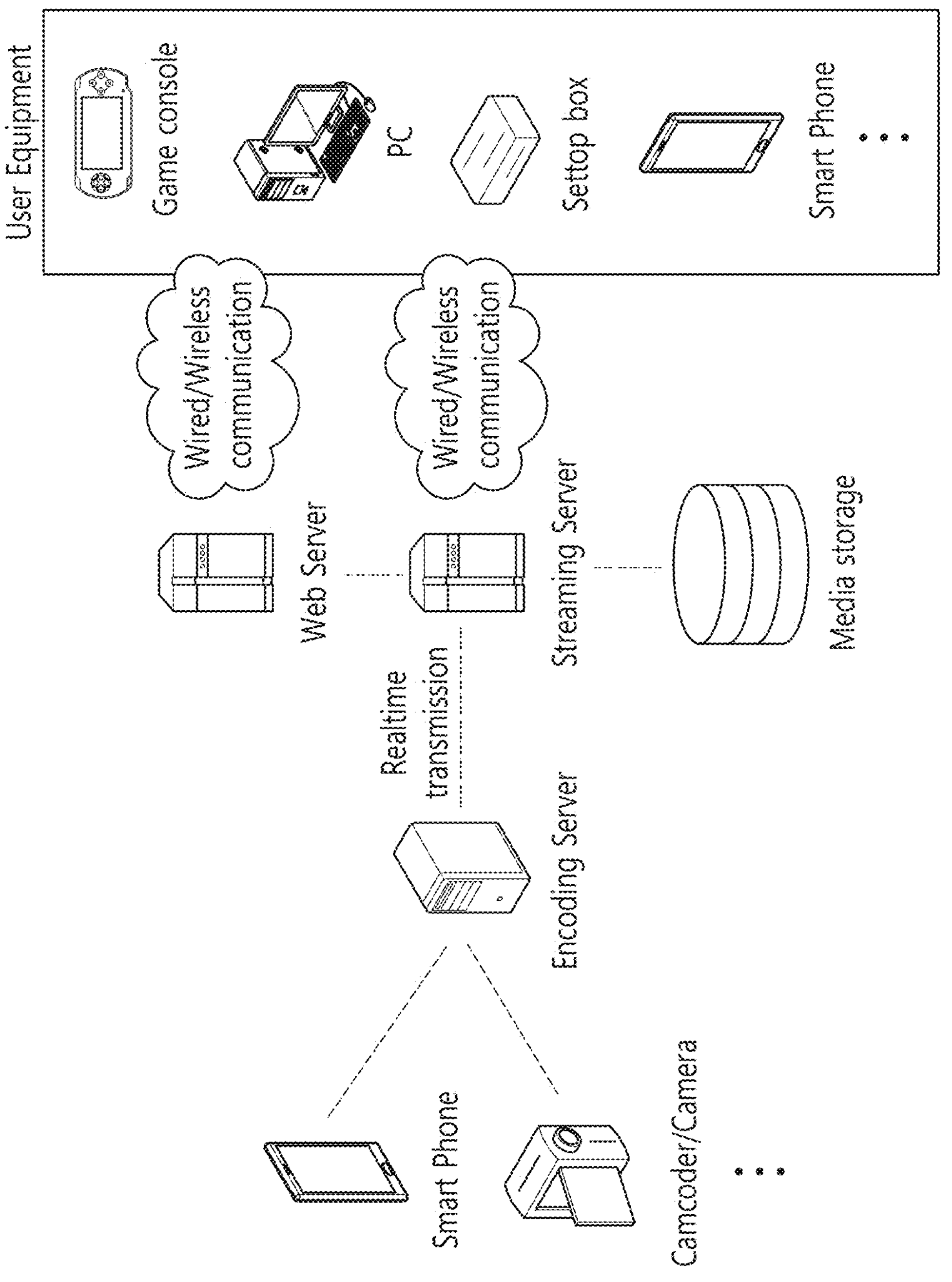
FIG. 9 illustratively represents a content streaming system structure diagram to which the present disclosure is applied.

FIG. 9 illustrates an example of a content streaming system to which embodiments disclosed in this document may be applied.

Referring to FIG. 9, the content streaming system to which the embodiments of the present document are applied may basically include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. smartwatches, smart glasses, head mounted displays), digital TVs, desktops computer, digital signage, and the like.

Each server in the content streaming system may be operated as a distributed server, in which case data received from each server may be distributed.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claims of the present specification and the technical features of the apparatus claims may be combined to be implemented as an apparatus, and the technical features of the method claims and the technical features of the apparatus claims of the present specification may be combined and implemented as a method.

What is claimed is:

1. An image decoding method performed by a decoding apparatus, the method comprising:

obtaining image information including residual information from a bitstream;

deriving quantized transform coefficients for a current block based on the residual information;

deriving transform coefficients based on the quantized transform coefficients;

deriving residual samples based on the transform coefficients; and generating reconstructed samples based on the residual samples, wherein the image information includes an adaptation parameter set, APS, wherein the APS includes APS identification information and type information of APS parameters, wherein the type information specifies which information is included in the APS among information related to Adaptive Loop Filter, ALF, parameters, information related to Luma Mapping with Chroma Scaling, LMCS, parameters, or information related to scaling list data, wherein only one information among the information related to the ALF parameters, the information related to the LMCS parameters, and the information related to the scaling list data is included in the APS based on the type information, wherein, based on the type information specifying that the APS is a SCALING_APS, the APS includes the scaling list data, wherein the scaling list data includes scaling list parameters used in a dequantization process for the quantized transform coefficients, wherein the deriving of the transform coefficients comprises:

obtaining the scaling list data from the APS based on the type information specifying that the APS is the SCALING_APS; and deriving the transform coefficients by applying the dequantization process to the quantized transform coefficients based on the scaling list data, wherein the image information includes header information related to a picture including the current block, wherein the image information includes a sequence parameter set, SPS, wherein the SPS includes first available flag information indicating whether the scaling list data is available for a scaling process for the transform coefficients, wherein, based on the first available flag information indicating that the scaling list data is available, the header information includes second available flag information indicating whether the scaling list data is available in the picture, wherein, based on the second available flag information indicating that the scaling list data is available in the picture, the header information includes APS identification information related to the scaling list data, wherein the APS identification information related to the scaling list data specifies APS identification information of the SCALING_APS including the scaling list data, wherein the scaling list data is obtained from the SCALING_APS by identifying the SCALING_APS based on the APS identification information related to the scaling list data included in the header information, and wherein the scaling list data obtained from the SCALING_APS is used in the scaling process for deriving the transform coefficients when the second available flag information indicates that the scaling list data is available in the picture.

2. An image encoding method performed by an image encoding apparatus, the method comprising:

deriving residual samples for a current block;

deriving transform coefficients based on the residual samples;

deriving quantized transform coefficients by applying a quantization process to the transform coefficients;

generating residual information including information on the quantized transform coefficients; and encoding image information including the residual information, wherein the image information includes an adaptation parameter set, APS, wherein the APS includes APS identification information and type information of APS parameters, wherein the type information specifies which information is included in the APS among information related to Adaptive Loop Filter, ALF, parameters, information related to Luma Mapping with Chroma Scaling, LMCS, parameters, or information related to scaling list data, wherein only one information among the information related to the ALF parameters, the information related to the LMCS parameters, and the information related to the scaling list data is included in the APS based on the type information, wherein, based on the type information specifying that the APS is a SCALING_APS, the APS includes the scaling list data, wherein the scaling list data includes scaling list parameters used in a scaling process for the transform coefficients, wherein the deriving of the quantized transform coefficients comprises deriving the quantized transform coefficients by applying the quantization process to the transform coefficients based on the scaling list data, wherein the image information includes header information related to a picture including the current block, wherein the image information includes a sequence parameter set, SPS, wherein the SPS includes first available flag information indicating whether the scaling list data is available for the scaling process for the transform coefficients, wherein, based on the first available flag information indicating that the scaling list data is available, the header information includes second available flag information indicating whether the scaling list data is available in the picture, wherein, based on the second available flag information indicating that the scaling list data is available in the picture, the header information includes APS identification information related to the scaling list data, wherein the APS identification information related to the scaling list data specifies APS identification information of the SCALING_APS including the scaling list data, wherein the scaling list data is included in the SCALING_APS identified based on the APS identification information related to the scaling list data included in the header information, and wherein the scaling list data included in the SCALING_APS is used in the scaling process for deriving the quantized transform coefficients when the second available flag information indicates that the scaling list data is available in the picture.

3. A non-transitory computer-readable digital storage medium storing a bitstream generated by the method of claim 2.

4. A method for transmitting data for image information, the method comprising:

obtaining a bitstream of the image information including residual information, wherein the bitstream is generated based on deriving residual samples for a current block, deriving transform coefficients based on the residual samples, generating residual information including information on the quantized transform coefficients, the image information including the residual information; and transmitting the data comprising the bitstream of the image information including the residual information, wherein the image information includes an adaptation parameter set, APS, wherein the APS includes APS identification information and type information of APS parameters, wherein the type information specifies which information is included in the APS among information related to Adaptive Loop Filter, ALE, parameters, information related to Luma Mapping with Chroma Scaling, LMCS, parameters, or information related to scaling list data, wherein only one information among the information related to the ALF parameters, the information related to the LMCS parameters, and the information related to the scaling list data is included in the APS based on the type information, wherein, based on the type information specifying that the APS is a SCALING_APS, the APS includes the scaling list data, wherein the scaling list data includes scaling list parameters used in a scaling process for the transform coefficients, wherein the bitstream is generated based on deriving the quantized transform coefficients by applying the quantization process to the transform coefficients based on the scaling list data, wherein the image information includes header information related to a picture including the current block, wherein the image information includes a sequence parameter set, SPS, wherein the SPS includes first available flag information indicating whether the scaling list data is available for the scaling process for the transform coefficients, wherein, based on the first available flag information indicating that the scaling list data is available, the header information includes second available flag information indicating whether the scaling list data is available in the picture, wherein, based on the second available flag information indicating that the scaling list data is available in the picture, the header information includes APS identification information related to the scaling list data, wherein the APS identification information related to the scaling list data specifies APS identification information of the SCALING_APS including the scaling list data, wherein the scaling list data is included in the SCALING_APS identified based on the APS identification information related to the scaling list data included in the header information, and wherein the scaling list data included in the SCALING_APS is used in the scaling process for deriving the quantized transform coefficients when the second available flag information indicates that the scaling list data is available in the picture.

* * * * *